(12) United States Patent
Wallack et al.

(10) Patent No.: US 8,111,904 B2
(45) Date of Patent: Feb. 7, 2012

(54) METHODS AND APPARATUS FOR PRACTICAL 3D VISION SYSTEM

(75) Inventors: Aaron S Wallack, Natick, MA (US); David Michael, Wayland, MA (US)

(73) Assignee: Cognex Technology and Investment Corp., Mountain View, CA (US)

( * ) Notice: Subject to any disclaimer, the term of this patent is extended or adjusted under 35 U.S.C. 154(b) by 734 days.

(21) Appl. No.: 11/246,024

(22) Filed: Oct. 7, 2005

(65) Prior Publication Data

US 2007/0081714 A1    Apr. 12, 2007

(51) Int. Cl.
*G06K 9/00* (2006.01)
*G06K 9/40* (2006.01)

(52) U.S. Cl. .......................... 382/152; 382/154; 348/92
(58) Field of Classification Search .................. 382/152, 382/153, 154, 144, 128, 195, 224, 174, 219, 382/157, 155, 107, 100, 228; 359/512; 700/245, 700/259, 64; 706/25
See application file for complete search history.

(56) References Cited

U.S. PATENT DOCUMENTS

| | | | |
|---|---|---|---|
| 3,727,034 | A | 4/1973 | Pope |
| 3,779,178 | A | 12/1973 | Riseley, Jr. |
| 3,816,722 | A | 6/1974 | Sakoe et al. |
| 3,936,800 | A | 2/1976 | Ejiri et al. |
| 3,967,100 | A | 6/1976 | Shimomura |
| 3,968,475 | A | 7/1976 | McMahon |
| 3,978,326 | A | 8/1976 | Shimomura |
| 4,000,400 | A | 12/1976 | Elder |
| 4,011,403 | A | 3/1977 | Epstein et al. |
| 4,115,702 | A | 9/1978 | Nopper |
| 4,115,762 | A | 9/1978 | Akiyama et al. |
| 4,183,013 | A | 1/1980 | Agrawala et al. |
| 4,200,861 | A | 4/1980 | Hubach et al. |

(Continued)

FOREIGN PATENT DOCUMENTS

EP    0 265 302 A1    9/1987

(Continued)

OTHER PUBLICATIONS

Tsai et al. A versatile Camera Calibration technique for high accuracy 3D machine vision metrology using off-the shelf TV cameras and lenses, IEEE 1987; p. 323-344.*

(Continued)

*Primary Examiner* — Daniel Mariam
*Assistant Examiner* — Nancy Bitar
(74) *Attorney, Agent, or Firm* — David J. Powsner

(57) ABSTRACT

The invention provides inter alia methods and apparatus for determining the pose, e.g., position along x-, y- and z-axes, pitch, roll and yaw (or one or more characteristics of that pose) of an object in three dimensions by triangulation of data gleaned from multiple images of the object. Thus, for example, in one aspect, the invention provides a method for 3D machine vision in which, during a calibration step, multiple cameras disposed to acquire images of the object from different respective viewpoints are calibrated to discern a mapping function that identifies rays in 3D space emanating from each respective camera's lens that correspond to pixel locations in that camera's field of view. In a training step, functionality associated with the cameras is trained to recognize expected patterns in images to be acquired of the object. A runtime step triangulates locations in 3D space of one or more of those patterns from pixel-wise positions of those patterns in images of the object and from the mappings discerned during calibration step.

30 Claims, 4 Drawing Sheets

U.S. PATENT DOCUMENTS

| | | |
|---|---|---|
| 4,254,400 A | 3/1981 | Yoda et al. |
| 4,286,293 A | 8/1981 | Jablonowski |
| 4,300,164 A | 11/1981 | Sacks |
| 4,303,851 A | 12/1981 | Mottier |
| 4,382,255 A | 5/1983 | Pretini |
| 4,385,322 A | 5/1983 | Hubach et al. |
| 4,435,837 A | 3/1984 | Abernathy |
| 4,441,124 A | 4/1984 | Heebner et al. |
| 4,441,206 A | 4/1984 | Kuniyoshi et al. |
| 4,519,041 A | 5/1985 | Fant et al. |
| 4,534,813 A | 8/1985 | Williamson et al. |
| 4,541,116 A | 9/1985 | Lougheed |
| 4,545,067 A | 10/1985 | Juvin et al. |
| 4,570,180 A | 2/1986 | Baier et al. |
| 4,577,344 A | 3/1986 | Warren et al. |
| 4,581,762 A | 4/1986 | Lapidus et al. |
| 4,606,065 A | 8/1986 | Beg et al. |
| 4,617,619 A | 10/1986 | Gehly |
| 4,630,306 A | 12/1986 | West et al. |
| 4,631,750 A | 12/1986 | Gabriel et al. |
| 4,641,349 A | 2/1987 | Flom et al. |
| 4,688,088 A | 8/1987 | Hamazaki et al. |
| 4,706,168 A | 11/1987 | Weisner |
| 4,707,647 A | 11/1987 | Coldren et al. |
| 4,728,195 A | 3/1988 | Silver |
| 4,730,260 A | 3/1988 | Mori et al. |
| 4,731,858 A | 3/1988 | Grasmueller et al. |
| 4,736,437 A | 4/1988 | Sacks et al. |
| 4,742,551 A | 5/1988 | Deering |
| 4,752,898 A | 6/1988 | Koenig |
| 4,758,782 A | 7/1988 | Kobayashi |
| 4,764,870 A | 8/1988 | Haskin |
| 4,771,469 A | 9/1988 | Wittenburg |
| 4,776,027 A | 10/1988 | Hisano et al. |
| 4,782,238 A | 11/1988 | Radl et al. |
| 4,783,826 A | 11/1988 | Koso |
| 4,783,828 A | 11/1988 | Sadjadi |
| 4,783,829 A | 11/1988 | Miyakawa et al. |
| 4,799,243 A | 1/1989 | Zepke |
| 4,809,077 A | 2/1989 | Norita et al. |
| 4,821,333 A | 4/1989 | Gillies |
| 4,831,580 A | 5/1989 | Yamada |
| 4,847,485 A | 7/1989 | Koelsch |
| 4,860,374 A | 8/1989 | Murakami et al. |
| 4,860,375 A | 8/1989 | McCubbrey et al. |
| 4,876,457 A | 10/1989 | Bose |
| 4,876,728 A | 10/1989 | Roth |
| 4,891,767 A | 1/1990 | Rzasa et al. |
| 4,903,218 A | 2/1990 | Longo et al. |
| 4,907,169 A | 3/1990 | Lovoi |
| 4,908,874 A | 3/1990 | Gabriel |
| 4,912,559 A | 3/1990 | Ariyoshi et al. |
| 4,912,659 A | 3/1990 | Liang |
| 4,914,553 A | 4/1990 | Hamada et al. |
| 4,922,543 A | 5/1990 | Ahlbom et al. |
| 4,926,492 A | 5/1990 | Tanaka et al. |
| 4,932,065 A | 6/1990 | Feldgajer |
| 4,953,224 A | 8/1990 | Ichinose et al. |
| 4,955,062 A | 9/1990 | Terui |
| 4,959,898 A | 10/1990 | Landman et al. |
| 4,962,423 A | 10/1990 | Yamada et al. |
| 4,970,653 A | 11/1990 | Kenue |
| 4,972,359 A | 11/1990 | Silver et al. |
| 4,982,438 A | 1/1991 | Usami et al. |
| 4,998,209 A | 3/1991 | Vuichard et al. |
| 5,005,126 A | 4/1991 | Haskin |
| 5,012,402 A | 4/1991 | Akiyama |
| 5,012,433 A | 4/1991 | Callahan et al. |
| 5,012,524 A | 4/1991 | LeBeau |
| 5,027,419 A | 6/1991 | Davis |
| 5,046,190 A | 9/1991 | Daniel et al. |
| 5,054,096 A | 10/1991 | Beizer |
| 5,060,276 A | 10/1991 | Morris et al. |
| 5,063,608 A | 11/1991 | Siegel |
| 5,073,958 A | 12/1991 | Imme |
| 5,075,864 A | 12/1991 | Sakai |
| 5,081,656 A | 1/1992 | Baker et al. |
| 5,081,689 A | 1/1992 | Meyer et al. |
| 5,083,073 A | 1/1992 | Kato |
| 5,086,478 A | 2/1992 | Kelly-Mahaffey et al. |
| 5,090,576 A | 2/1992 | Menten |
| 5,091,861 A | 2/1992 | Geller et al. |
| 5,091,968 A | 2/1992 | Higgins et al. |
| 5,093,867 A | 3/1992 | Hori et al. |
| 5,097,454 A | 3/1992 | Schwarz et al. |
| 5,113,565 A | 5/1992 | Cipolla et al. |
| 5,115,309 A | 5/1992 | Hang |
| 5,119,435 A | 6/1992 | Berkin |
| 5,124,622 A | 6/1992 | Kawamura et al. |
| 5,133,022 A | 7/1992 | Weideman |
| 5,134,575 A | 7/1992 | Takagi |
| 5,143,436 A | 9/1992 | Baylor et al. |
| 5,145,432 A | 9/1992 | Midland et al. |
| 5,151,951 A | 9/1992 | Ueda et al. |
| 5,153,925 A | 10/1992 | Tanioka et al. |
| 5,155,775 A | 10/1992 | Brown |
| 5,159,281 A | 10/1992 | Hedstrom et al. |
| 5,159,645 A | 10/1992 | Kumagai |
| 5,164,994 A | 11/1992 | Bushroe |
| 5,168,269 A | 12/1992 | Harlan |
| 5,175,808 A | 12/1992 | Sayre |
| 5,179,419 A | 1/1993 | Palmquist et al. |
| 5,185,810 A | 2/1993 | Freischlad |
| 5,185,855 A | 2/1993 | Kato et al. |
| 5,189,712 A | 2/1993 | Kajiwara et al. |
| 5,201,906 A | 4/1993 | Schwarz et al. |
| 5,204,944 A | 4/1993 | Wolberg et al. |
| 5,206,820 A | 4/1993 | Ammann et al. |
| 5,208,750 A | 5/1993 | Kurami et al. |
| 5,216,503 A | 6/1993 | Paik |
| 5,225,940 A | 7/1993 | Ishii et al. |
| 5,230,027 A | 7/1993 | Kikuchi |
| 5,243,607 A | 9/1993 | Masson et al. |
| 5,253,306 A | 10/1993 | Nishio |
| 5,253,308 A | 10/1993 | Johnson |
| 5,259,038 A | 11/1993 | Sakou et al. |
| 5,265,173 A | 11/1993 | Griffin et al. |
| 5,271,068 A | 12/1993 | Ueda et al. |
| 5,287,449 A | 2/1994 | Kojima |
| 5,297,238 A | 3/1994 | Wang et al. |
| 5,297,256 A | 3/1994 | Wolstenholme et al. |
| 5,299,269 A | 3/1994 | Gaborski et al. |
| 5,301,115 A | 4/1994 | Nouso |
| 5,307,419 A | 4/1994 | Tsujino et al. |
| 5,311,598 A | 5/1994 | Bose et al. |
| 5,315,388 A | 5/1994 | Shen et al. |
| 5,319,457 A | 6/1994 | Nakahashi et al. |
| 5,327,156 A | 7/1994 | Masukane et al. |
| 5,329,469 A | 7/1994 | Watanabe |
| 5,337,262 A | 8/1994 | Luthi et al. |
| 5,337,267 A | 8/1994 | Colavin |
| 5,363,507 A | 11/1994 | Nakayama et al. |
| 5,367,439 A | 11/1994 | Mayer et al. |
| 5,367,667 A | 11/1994 | Wahlquist et al. |
| 5,371,690 A | 12/1994 | Engel et al. |
| 5,371,836 A | 12/1994 | Mitomi et al. |
| 5,387,768 A | 2/1995 | Tzard et al. |
| 5,388,197 A | 2/1995 | Rayner |
| 5,388,252 A | 2/1995 | Dreste et al. |
| 5,398,292 A | 3/1995 | Aoyama |
| 5,432,525 A | 7/1995 | Maruo et al. |
| 5,432,712 A | 7/1995 | Chan |
| 5,440,699 A | 8/1995 | Farrand et al. |
| 5,455,870 A | 10/1995 | Sepai et al. |
| 5,455,933 A | 10/1995 | Schieve et al. |
| 5,471,312 A | 11/1995 | Watanabe et al. |
| 5,475,766 A | 12/1995 | Tsuchiya et al. |
| 5,475,803 A | 12/1995 | Stearns et al. |
| 5,477,138 A | 12/1995 | Erjavic et al. |
| 5,481,712 A | 1/1996 | Silver et al. |
| 5,485,570 A | 1/1996 | Busboom et al. |
| 5,491,780 A | 2/1996 | Fyles et al. |
| 5,495,424 A | 2/1996 | Tokura |
| 5,495,537 A | 2/1996 | Bedrosian et al. |
| 5,496,106 A | 3/1996 | Anderson |
| 5,500,906 A | 3/1996 | Picard et al. |
| 5,506,617 A | 4/1996 | Parulski et al. |

| Patent | Date | Inventor |
|---|---|---|
| 5,506,682 A | 4/1996 | Pryor |
| 5,511,015 A | 4/1996 | Flockencier |
| 5,519,784 A | 5/1996 | Vermeulen |
| 5,519,840 A | 5/1996 | Matias et al. |
| 5,526,050 A | 6/1996 | King et al. |
| 5,528,703 A | 6/1996 | Lee |
| 5,529,138 A | 6/1996 | Shaw et al. |
| 5,532,739 A | 7/1996 | Garakani et al. |
| 5,539,409 A | 7/1996 | Mathews et al. |
| 5,544,256 A | 8/1996 | Brecher et al. |
| 5,548,326 A | 8/1996 | Michael |
| 5,550,763 A | 8/1996 | Michael |
| 5,550,888 A | 8/1996 | Neitzel et al. |
| 5,553,859 A | 9/1996 | Kelly et al. |
| 5,555,312 A | 9/1996 | Shima et al. |
| 5,557,410 A | 9/1996 | Huber et al. |
| 5,557,690 A | 9/1996 | O'Gorman et al. |
| 5,559,551 A | 9/1996 | Sakamoto et al. |
| 5,559,904 A | 9/1996 | Holzmann |
| 5,565,918 A | 10/1996 | Homma et al. |
| 5,566,877 A | 10/1996 | McCormack |
| 5,568,563 A | 10/1996 | Tanaka et al. |
| 5,574,668 A | 11/1996 | Beaty |
| 5,574,801 A | 11/1996 | Collet-Beillon |
| 5,581,250 A | 12/1996 | Khvilivitzky |
| 5,581,625 A | 12/1996 | Connell |
| 5,581,632 A | 12/1996 | Koljonen et al. |
| 5,583,949 A | 12/1996 | Smith et al. |
| 5,583,954 A | 12/1996 | Garakani |
| 5,586,058 A | 12/1996 | Aloni et al. |
| 5,592,562 A | 1/1997 | Rooks |
| 5,594,859 A | 1/1997 | Palmer et al. |
| 5,598,345 A | 1/1997 | Tokura |
| 5,602,937 A | 2/1997 | Bedrosian et al. |
| 5,608,490 A | 3/1997 | Ogawa |
| 5,608,872 A | 3/1997 | Schwartz et al. |
| 5,621,811 A | 4/1997 | Roder et al. |
| 5,627,915 A | 5/1997 | Rosser et al. |
| 5,640,199 A | 6/1997 | Garakani et al. |
| 5,640,200 A | 6/1997 | Michael |
| 5,642,106 A | 6/1997 | Hancock et al. |
| 5,642,158 A | 6/1997 | Petry, III et al. |
| 5,647,009 A | 7/1997 | Aoki et al. |
| 5,649,032 A | 7/1997 | Burt et al. |
| 5,652,658 A | 7/1997 | Jackson et al. |
| 5,657,403 A | 8/1997 | Wolff et al. |
| 5,673,334 A | 9/1997 | Nichani et al. |
| 5,675,358 A | 10/1997 | Bullock et al. |
| 5,676,302 A | 10/1997 | Petry, III |
| 5,684,530 A | 11/1997 | White |
| 5,696,848 A | 12/1997 | Patti et al. |
| 5,706,355 A | 1/1998 | Raboisson et al. |
| 5,715,369 A | 2/1998 | Spoltman et al. |
| 5,715,385 A | 2/1998 | Stearns et al. |
| 5,717,785 A | 2/1998 | Silver |
| 5,724,439 A | 3/1998 | Mizuoka et al. |
| 5,734,807 A | 3/1998 | Sumi |
| 5,739,846 A | 4/1998 | Gieskes |
| 5,740,285 A | 4/1998 | Bloomberg et al. |
| 5,742,037 A | 4/1998 | Scola et al. |
| 5,751,853 A | 5/1998 | Michael |
| 5,754,679 A | 5/1998 | Koljonen et al. |
| 5,757,956 A | 5/1998 | Koljonen et al. |
| 5,761,326 A | 6/1998 | Brady et al. |
| 5,761,337 A | 6/1998 | Nishimura et al. |
| 5,768,443 A | 6/1998 | Michael et al. |
| 5,793,899 A | 8/1998 | Wolff et al. |
| 5,796,386 A | 8/1998 | Lipscomb et al. |
| 5,796,868 A | 8/1998 | Dutta-Choudhury |
| 5,801,966 A | 9/1998 | Ohashi |
| 5,805,722 A | 9/1998 | Cullen et al. |
| 5,809,658 A | 9/1998 | Jackson et al. |
| 5,818,443 A | 10/1998 | Schott |
| 5,822,055 A | 10/1998 | Tsai et al. |
| 5,825,483 A | 10/1998 | Michael et al. |
| 5,825,913 A | 10/1998 | Rostami et al. |
| 5,835,099 A | 11/1998 | Marimont |
| 5,835,622 A | 11/1998 | Koljonen et al. |
| 5,845,007 A | 12/1998 | Ohashi et al. |
| 5,847,714 A | 12/1998 | Naqvi et al. |
| 5,848,189 A | 12/1998 | Pearson et al. |
| 5,850,466 A | 12/1998 | Schott |
| 5,859,923 A | 1/1999 | Petry, III et al. |
| 5,859,924 A | 1/1999 | Liu et al. |
| 5,861,909 A | 1/1999 | Garakani et al. |
| 5,866,887 A | 2/1999 | Hashimoto et al. |
| 5,870,495 A | 2/1999 | Mancuso et al. |
| 5,872,870 A | 2/1999 | Michael |
| 5,878,152 A | 3/1999 | Sussman |
| 5,880,782 A | 3/1999 | Koyanagi et al. |
| 5,900,975 A | 5/1999 | Sussman |
| 5,901,241 A | 5/1999 | Koljonen et al. |
| 5,909,504 A | 6/1999 | Whitman |
| 5,912,768 A | 6/1999 | Sissom et al. |
| 5,912,984 A | 6/1999 | Michael et al. |
| 5,917,937 A | 6/1999 | Szeliski et al. |
| 5,918,196 A | 6/1999 | Jacobson |
| 5,933,523 A | 8/1999 | Drisko et al. |
| 5,943,441 A | 8/1999 | Michael |
| 5,949,901 A | 9/1999 | Nichani et al. |
| 5,953,130 A | 9/1999 | Benedict et al. |
| 5,960,125 A | 9/1999 | Michael et al. |
| 5,961,571 A | 10/1999 | Gorr et al. |
| 5,974,169 A | 10/1999 | Bachelder |
| 5,974,365 A | 10/1999 | Mitchell |
| 5,978,080 A | 11/1999 | Michael et al. |
| 5,978,502 A | 11/1999 | Ohashi |
| 5,978,521 A | 11/1999 | Wallack et al. |
| 5,995,649 A | 11/1999 | Marugame |
| 6,002,738 A | 12/1999 | Cabral et al. |
| 6,002,793 A | 12/1999 | Silver et al. |
| 6,005,965 A | 12/1999 | Tsuda et al. |
| 6,016,152 A | 1/2000 | Dickie |
| 6,025,854 A | 2/2000 | Hinz et al. |
| 6,026,172 A | 2/2000 | Lewis, Jr. et al. |
| 6,026,176 A | 2/2000 | Whitman |
| 6,028,626 A | 2/2000 | Aviv |
| 6,067,379 A | 5/2000 | Silver |
| 6,069,668 A | 5/2000 | Woodham, Jr. et al. |
| 6,075,881 A | 6/2000 | Foster et al. |
| 6,081,619 A | 6/2000 | Kazuhiko et al. |
| 6,084,631 A | 7/2000 | Tonkin et al. |
| 6,118,540 A | 9/2000 | Roy et al. |
| 6,137,893 A | 10/2000 | Michael et al. |
| 6,141,033 A | 10/2000 | Michael et al. |
| 6,141,040 A | 10/2000 | Toh |
| 6,166,811 A | 12/2000 | Long et al. |
| 6,173,070 B1 | 1/2001 | Michael et al. |
| 6,188,784 B1 | 2/2001 | Linker, Jr. |
| 6,195,102 B1 | 2/2001 | McNeil et al. |
| 6,205,233 B1 | 3/2001 | Morley et al. |
| 6,205,242 B1 | 3/2001 | Onoguchi et al. |
| 6,215,898 B1 | 4/2001 | Woodfill et al. |
| 6,215,915 B1 | 4/2001 | Reyzin |
| 6,226,396 B1 | 5/2001 | Marugame et al. |
| 6,236,769 B1 | 5/2001 | Desai |
| 6,259,827 B1 | 7/2001 | Nichani |
| 6,279,579 B1 * | 8/2001 | Riaziat et al. ................ 128/897 |
| 6,282,328 B1 | 8/2001 | Desai |
| 6,295,367 B1 | 9/2001 | Crabtree et al. |
| 6,297,844 B1 | 10/2001 | Schatz et al. |
| 6,298,149 B1 | 10/2001 | Nichani et al. |
| 6,301,396 B1 | 10/2001 | Michael et al. |
| 6,301,440 B1 | 10/2001 | Bolle et al. |
| 6,304,050 B1 | 10/2001 | Skaar et al. |
| 6,307,951 B1 | 10/2001 | Tanigawa et al. |
| 6,308,644 B1 | 10/2001 | Diaz |
| 6,341,016 B1 * | 1/2002 | Malione ....................... 356/603 |
| 6,345,105 B1 | 2/2002 | Nitta et al. |
| 6,357,588 B1 | 3/2002 | Room et al. |
| 6,381,366 B1 | 4/2002 | Taycher et al. |
| 6,381,375 B1 | 4/2002 | Reyzin |
| 6,389,029 B1 | 5/2002 | McAlear |
| 6,396,949 B1 | 5/2002 | Nichani |
| 6,408,109 B1 | 6/2002 | Silver et al. |
| 6,442,291 B1 | 8/2002 | Whitman |
| 6,469,734 B1 | 10/2002 | Nichani et al. |
| 6,477,275 B1 | 11/2002 | Melikian et al. |

| | | |
|---|---|---|
| 6,496,204 B1 | 12/2002 | Nakamura |
| 6,496,220 B2 | 12/2002 | Landert et al. |
| 6,516,092 B1 | 2/2003 | Bachelder et al. |
| 6,539,107 B1 | 3/2003 | Michael et al. |
| 6,594,623 B1 | 7/2003 | Wang et al. |
| 6,624,899 B1 | 9/2003 | Clark |
| 6,639,624 B1* | 10/2003 | Bachelder et al. ............ 348/87 |
| 6,658,145 B1 | 12/2003 | Silver et al. |
| 6,678,394 B1 | 1/2004 | Nichani |
| 6,681,151 B1 | 1/2004 | Weinzimmer et al. |
| 6,684,402 B1 | 1/2004 | Wolff |
| 6,690,354 B2 | 2/2004 | Sze |
| 6,701,005 B1 | 3/2004 | Nichani |
| 6,710,770 B2 | 3/2004 | Tomasi et al. |
| 6,718,074 B1 | 4/2004 | Dutta-Choudhury et al. |
| 6,720,874 B2 | 4/2004 | Fufido et al. |
| 6,724,922 B1 | 4/2004 | Vilsmeier |
| 6,728,582 B1 | 4/2004 | Wallack |
| 6,748,104 B1 | 6/2004 | Bachelder et al. |
| 6,751,338 B1 | 6/2004 | Wallack |
| 6,751,361 B1 | 6/2004 | Wagman |
| 6,756,910 B2 | 6/2004 | Ohba et al. |
| 6,768,509 B1 | 7/2004 | Bradski |
| 6,771,808 B1* | 8/2004 | Wallack .................. 382/151 |
| 6,791,461 B2 | 9/2004 | Oku et al. |
| 6,798,925 B1 | 9/2004 | Wagman |
| 6,816,187 B1 | 11/2004 | Iwai et al. |
| 6,816,755 B2* | 11/2004 | Habibi et al. .............. 700/259 |
| 6,850,646 B1 | 2/2005 | Silver et al. |
| 6,856,698 B1* | 2/2005 | Silver et al. ............... 382/199 |
| 6,903,177 B2 | 6/2005 | Seo et al. |
| 6,919,549 B2 | 7/2005 | Bamji et al. |
| 6,940,545 B1 | 9/2005 | Ray et al. |
| 6,963,661 B1 | 11/2005 | Hattori et al. |
| 6,971,580 B2* | 12/2005 | Zhu et al. ................ 235/472.01 |
| 6,990,228 B1* | 1/2006 | Wiles et al. ............... 382/154 |
| 6,993,177 B1* | 1/2006 | Bachelder .................. 382/151 |
| 6,999,600 B2 | 2/2006 | Venetianer et al. |
| 7,003,136 B1 | 2/2006 | Harville |
| 7,006,669 B1* | 2/2006 | Lavagnino et al. .......... 382/111 |
| 7,058,204 B2 | 6/2006 | Hildreth et al. |
| 7,085,622 B2 | 8/2006 | Sadighi et al. |
| 7,088,236 B2 | 8/2006 | Sorensen |
| 7,106,898 B2* | 9/2006 | Bouguet et al. ............ 382/154 |
| 7,146,028 B2 | 12/2006 | Lestideau |
| 7,204,254 B2* | 4/2007 | Riaziat et al. ............... 128/897 |
| 7,212,228 B2 | 5/2007 | Utsumi et al. |
| 7,239,761 B2* | 7/2007 | Weilenmann ............... 382/312 |
| 7,260,241 B2 | 8/2007 | Fukuhara et al. |
| 7,356,425 B2 | 4/2008 | Krahnstoever et al. |
| 7,360,410 B2 | 4/2008 | Steinbichler et al. |
| 7,373,270 B2 | 5/2008 | Ohashi et al. |
| 7,382,895 B2 | 6/2008 | Bramblet et al. |
| 7,400,744 B2* | 7/2008 | Nichani et al. ............. 382/103 |
| 7,403,648 B2* | 7/2008 | Nakamura .................. 382/141 |
| 7,414,732 B2 | 8/2008 | Maidhof et al. |
| 7,471,846 B2 | 12/2008 | Steinberg et al. |
| 7,508,974 B2* | 3/2009 | Beaty et al. ............... 382/145 |
| 7,538,801 B2 | 5/2009 | Hu |
| 7,539,595 B2* | 5/2009 | Georgi et al. .............. 702/150 |
| 7,609,893 B2* | 10/2009 | Luo et al. .................. 382/224 |
| 7,680,323 B1 | 3/2010 | Nichani |
| 7,777,300 B2 | 8/2010 | Tews et al. |
| 2001/0010731 A1 | 8/2001 | Miyatake et al. |
| 2001/0030689 A1 | 10/2001 | Spinelli |
| 2002/0039135 A1 | 4/2002 | Heyden |
| 2002/0041698 A1 | 4/2002 | Ito et al. |
| 2002/0113862 A1 | 8/2002 | Center et al. |
| 2002/0118113 A1 | 8/2002 | Oku et al. |
| 2002/0118114 A1 | 8/2002 | Ohba et al. |
| 2002/0135483 A1 | 9/2002 | Merheim et al. |
| 2002/0191819 A1 | 12/2002 | Hashimoto et al. |
| 2003/0053660 A1 | 3/2003 | Heyden |
| 2003/0071199 A1 | 4/2003 | Esping et al. |
| 2003/0164892 A1 | 9/2003 | Shiraishi et al. |
| 2004/0017929 A1 | 1/2004 | Bramblet et al. |
| 2004/0045339 A1 | 3/2004 | Nichani et al. |
| 2004/0061781 A1 | 4/2004 | Fennell et al. |
| 2004/0153671 A1 | 8/2004 | Schuyler et al. |
| 2004/0218784 A1 | 11/2004 | Nichani et al. |
| 2004/0234118 A1 | 11/2004 | Astrom et al. |
| 2005/0089214 A1* | 4/2005 | Rubbert et al. ............. 382/154 |
| 2005/0105765 A1 | 5/2005 | Han et al. |
| 2005/0074140 A1 | 7/2005 | Grasso et al. |
| 2005/0196047 A1* | 9/2005 | Owechko et al. ............ 382/224 |
| 2007/0081714 A1 | 4/2007 | Wallack et al. |
| 2007/0127774 A1 | 6/2007 | Zhang et al. |
| 2010/0166294 A1 | 7/2010 | Marrion et al. |

FOREIGN PATENT DOCUMENTS

| | | |
|---|---|---|
| EP | 0265302 | 9/1987 |
| EP | 0 341 122 A1 | 4/1989 |
| EP | 0341122 | 4/1989 |
| EP | 0 527 632 A2 | 2/1993 |
| EP | 0 777 381 A2 | 6/1997 |
| EP | 0847030 | 6/1998 |
| EP | 0 895 696 B1 | 2/1999 |
| EP | 0706062 | 5/2001 |
| EP | 0817123 | 9/2001 |
| FR | 2 598 019 | 10/1987 |
| FR | 25980119 | 10/1987 |
| JP | 62-56814 | 3/1987 |
| JP | 62-056814 A | 3/1987 |
| JP | 8-201021 | 8/1996 |
| JP | 2004-504077 | 2/2004 |
| JP | 2004-239747 | 8/2004 |
| JP | 2005-534026 | 11/2005 |
| WO | WO 91/10968 | 7/1991 |
| WO | 9511491 | 4/1995 |
| WO | WO 95/11491 | 4/1995 |
| WO | WO 95/21376 | 8/1995 |
| WO | WO 95/22137 | 8/1995 |
| WO | 9631047 | 3/1996 |
| WO | 9638820 | 12/1996 |
| WO | WO 97/21189 | 6/1997 |
| WO | WO 97/22858 | 6/1997 |
| WO | WO 97/24692 | 7/1997 |
| WO | WO 97/24693 | 7/1997 |
| WO | WO 97/39416 | 10/1997 |
| WO | 9808208 | 7/1998 |
| WO | WO 98/30890 | 7/1998 |
| WO | WO 98/52349 | 11/1998 |
| WO | WO 98/59490 | 12/1998 |
| WO | WO 99/15864 | 4/1999 |
| WO | WO 99/27456 | 6/1999 |
| WO | WO 99/48000 | 9/1999 |
| WO | 0175809 | 10/2001 |
| WO | 0248971 | 6/2002 |
| WO | 0295692 | 11/2002 |
| WO | WO 02/099615 | 12/2002 |
| WO | WO 02/100068 | 12/2002 |
| WO | WO 2007/044629 | 4/2007 |
| WO | 2008147355 | 12/2008 |
| WO | 2010077524 | 7/2010 |

OTHER PUBLICATIONS

Real-Time Pose Estimation of 3-D Objects from Camera Images Using Neural Networks; pp. 3232-3237 Wunsch et al; Apr. 2007.*
Bursky, Dave, "CMOS Four-Chip Set Process Images at 20-MHz Data Rates," Elect.ronic Design, May 28, 1987, pp. 39-44.
Chapter 3: "Guidelines for Developing MMX Code," Intel.
Chapter 4: "MMX Code Development Strategy," Intel.
Chapter 5: "MMX Coding Techniques," Intel.
Chapter 3: "Optimization Techniques for Integer Blended Code," Intel.
"Geometrical Image Modification," pp. 421-442.
Gevorkian David Z., Astola Jaakko T., and Atourian Samvel M. "Improving Gil-Werman Algorithm for Running Min and Max Filters" IEEE Transactions on Pattern Analysis and Machine Intelligence, vol. 19, No. 5, May 1997, pp. 526-529.
Gil, Joseph and Werman Michael. "Computing 2-D Min, Median, and Max Filters" IEEE Transactions on Pattern Analysis and Machine Intelligence, vol. 15, No. 5, May 1993, pp. 504-507.
Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Horn, Berthold Klaus Paul. "Robot Vision", The Massachusetts Institute for Technology, 1986.

Medina-Mora et al. (1981) An Incremental Programming Environment, IEEE Transactions on Software Eng. SE-7:472-482.

NEC Electronics Inc., PD7281 Image Pipelined Processor, Product Information Brochure, pp. 2-169-2-211.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

PictureTel Corporation Product Brochure, "Picturetel System 4000(tm) A Family of Models to Fit Your Application From Offices to Boardrooms, Classrooms, and Auditoriums," 4 pp. (1993).

Plessey Semiconductors, Preliminary Information, May 1986, Publication No. PS2067, May 1986, pp. 1-5.

Pratt, William K. Digital Image Processing (2nd Ed.), 1991, pp. 421-445.

Racca Roberto G., Stephenson Owen, and Clements Reginald M. High-speed video analysis system using multiple shuttered charge-coupled device imagers and digital storage. Optical Engineering (Jun. 1992) 31;6.

Ray, R. "Automated inspection of solder bumps using visual signatures of specular image-highlights," Computer Vision and Pattern Recognition, 1989. Proceedings CVPR '89. pp. 588-596.

Rosenfeld, Azriel. "Computer Vision: Basic Principles," Proceedings of the IEEE. vol. 76, No. 8, Aug. 1988. pp. 863-868.

Symantec Corporation, "The Norton pcAnywhere User's Guide," Table of Contents 8 pp; Introduction of pcAnywhere Technology pp. i-vii; Chapter 7—Sessions; pp. 191-240 (1991).

Teitelbaum et al. (19810 The Cornell Program Synthesizer: A Syntax-Directed Programming Environment, Communications of the ACM 24:563-573.

Tsai, Roger Y. "A Versatile Camera Calibration Technique for High-Accuracy 3D Mahcine Vision Metrology Using Off-the-Shelf TV Cameras and Lenses," The Journal of Robotics and Automation, vol. RA-3, No. 4, Aug. 1987, pp. 323-344.

Tsai, Roger Y. "An Efficient and Accurate Camera Calibration Technique for 3D Machine Vision," Proceedings IEEE Conference on Computer Vision and Pattern Recognition Jun. 22-26, 1986, pp. 364-374.

Turney, Jerry L. "Recognizing Partially Occluded Parts," IEEE Transactions on Pattern Analysis and Machine Intelligence, PAMI-7 Jul. 1985, No. 4, pp. 410-421.

Unser, Michael. "Convolution-Based Interpolation for Fast, High-Quality Rotation of Images," IEEE Transactions on Image Processing vol. 4 No. 10 (Oct. 1995) pp. 1371-1381.

Viitanen, Jouko, et al. "Hierarchical pattern matching with an efficient method for estimating rotations," Proceedings IECON '87 International Conference on Industrial Electronics, Control, and Instrumentation, Nov. 3-6, 1987, 6 pp.

Wu, Yifeng and Maitre, Henri. "Registration of a SPOT Image and a SAR Image Using Multiresolution Representation of a Coastline," 10th International Conference on Pattern Recognition Jun. 16-21, 1990, pp. 913-917.

International Search Report, Issued Jul. 26, 2007, Application No. PCT/US06/39324.

Burschka, et al., Scene Classification from Dense Disparity Mapis in Indoor Environments, Proceedings of ICPR 2002.

Canesta, Inc., Development Platform—DP200, Electronic Perception Technology—Real-time single chip 3D imaging, 11005-01 Rev 2, Jul. 12, 2004.

CEDES, News from the CEDES World, 2009.

CSEM SA, Swiss Ranger SR-2 Datasheet, CSEM Technologies for innovation, www.csem.ch, imaging@csem.ch, Bandenerstrasse 569, CH 8048, Zurich, Switzerland, 2004.

Gluckman, Joshua, et al, Planar Catadioptric Stereo: Geometry and Calibration, IEEE, 2009.

Gurovich, Alexander, et al, Automatic Door Control using Motion Recognition, Technion, Israel Institute of Technology, Aug. 1999.

Jain, et al, Machine Vision, Chapter 11—Depth, MIT Press and McGraw-Hill Inc. 1995, pp. 289-297.

Kalman, R. E., A New Approach to Linear Filtering and Prediction Problems, Transactions of the ASME, The Journal of Basic Engineering, 8, pp. 35-45, 1960.

Kanade, T., et al, A Stereo Machine for Video-rate Dense Depth Mapping and Its New Applications, Proc. IEEE Computer Vision and pattern Recognition, pp. 196-202, 1996.

Norris, Jeffery, Face Detection and Recognition in Office Environments, Department fo Electrical Engineering and Computer Science, Massachusetts Institute of Technology, May 21, 1999.

Pilz GmbH & Co., Safe camera system SafetyEye, http://www.pilz.com/products/sensors/camera/f/safetyeye/sub/ applications/index.enjsp, 2007.

Pollard, Stephen P., et al, A Stereo Correspondence Algorithm using a disparity gradient limit, Perception, vol. 14, 1985.

Prati, A., et al, Detecting Moving Shadows: Algorithms and Evaluations, IEEE Transactions on Pattern Analysis and Machine Intelligence, vol. 25, No. 7, pp. 918-923, 2003.

Roeder-Johnson Corporation, Low-cost, Broadly-Available Computer/Machine Vision Applications Much Closer with New Canesta Development Platform, Press Release, San Jose, CA, Aug. 10, 2004.

Tsai, R. Y., A Versatile Camera Calibration Technique for High-Accuracy 3D Machine vision Metrology using off-the-shelf TV Cameras and Lenses, IEEE J. Robotics and Automation, vol. 3, No. 4, Aug. 1987.

Weng, Agglomerative Clustering Algorithm, www.speech.sri.com, 1997.

Zhang, Z., A Flexible New Technique for Camera Calibration, Technical Report MSR-TR-98-71, Microsoft Research, Microsoft Corporation, pp. 1-22, Mar. 25, 1996.

International Search Report for PCT/US06/39324, Jul. 26, 2007.

Japanese application No. 2008-534751, Final Rejection, Sep. 10, 2010.

Japanese application No. 2008-534751, Response to Final Rejection, Feb. 9, 2011.

Danilidis, K, Hand-Eye Calibration Using Dual Quaternions, The International Journal of Robotics Research, vol. 18, No. 3, Mar. 1999, pp. 286-298.

Dhond, et al., Structure from Stereo—A Review, IEEE Transactions on Systems, Man, and Cybernetics, vol. 19 No. 6 Publication Date Dec. 1989.

Faugeras, et al., The Representation, Recognition, and Locating of 3-D Objects, vol. 5, No. 3, Publisher Massachusetts Institute of Technology Ref. pp. 27-52, Publication Date 1986.

Lavalee, Stephane, et al., Recovering the Position and Orientation of Free-Form Objects from Image Contours Using 3D Distance Maps, vol. 17, No. 4, IEEE, published in New York, Ref. pp. 378-382, Publication Date Apr. 17, 1995.

Schmidt, et al., Vector Quantization Based Data Selection for Hand-Eye Calibration, VMV 2004, Stanford, USA, Nov. 16-18, 2004, 8 pages.

Schmidt, et al., Robust Hand-Eye Calibration of an Endoscopic Surgery Robot Using Dual Quaternions, Pattern Recognition, Proceedings of the 25th DAGM Symposium, Magdeburg, Germany, Sep. 2003, pp. 548-556.

Stein, et al., Monitoring Activities from Multiple Video Streams Establishing a Common Coordinate Frame, Massachusetts Institute of Technology, Ref. pp. 1-23, Publication Date Apr. 1999.

Strobl, et al., Optimal Hand-Eye Calibration, Proceedings of the 20069 IEEE/RSJ International Conference on Intelligent Robots and Systems, Oct. 9-15, 2006, Beijing, China, pp. 4647-4653.

Wunsch, P., et al., Real-Time Pose Estimation of 3-D Objects from Camera Images Using Neural Networks Citation IEEE, Published in Albuquerque, Ref. Pages 3232-3237, Publication Date Apr. 2007.

Wunsch, P., et al., Registration of CAD-Models to Images by Interactive Inverse perspective Matching, IEEE, published in Wessling, Ref. pp. 78-83, Publication Date 1996.

Zhang, Zhengyou, A Flexible New Technique for Camera Calibration, Publisher Microsoft Research, published in Redmond, Washington, Ref. pp. 2-21, Publication Date Dec. 2, 1998.

Geys, et al., On-line Interactive View Synthesis and Augmentation, Signal Processing, Image communication 21:709-723, (2006).

Oh, et al., Laser Pointers as Collaberative Pointing devices, Graphics Interface: 2002 XP001232467, (May 27, 2009),141-149.

PCT Search Report and Written Opinion application No. PCT/US2010/036171, (Jul. 26, 2007).

Japanese Patent application No. 2008-534751, office action, May 24, 2011.

* cited by examiner

METHODS AND APPARATUS FOR PRACTICAL 3D VISION SYSTEM

BACKGROUND OF THE INVENTION

The invention pertains to machine vision and, more particularly, three-dimensional (3D) machine vision. The invention has application in manufacturing, quality control, and robotics, to name but a few fields.

Machine vision refers to the automated analysis of images to determine characteristics of objects represented in them. It is often employed in automated manufacturing lines, where images of components are analyzed to facilitate part-picking, as well as to determine part placement and alignment for assembly. When robots are the means for automated assembly and automated analysis of images is used to facilitate part picking, placement, and alignment, the system is referred to as vision-guided robotics. Machine vision is also used for robot navigation, e.g., to insure the recognition of scenes as robots travel through environments.

Though three-dimensional (3D) analysis has long been discussed in the literature, most present-day machine vision systems rely on two-dimensional (2D) image analysis. This typically necessitates that objects under inspection be "presented to" the vision system in constrained orientations and locations. A conveyor belt is commonly used for this purpose. Objects being assembled or inspected are typically placed at a particular known, stable, 3D configuration on the belt, but at an unknown position and orientation and moved to within the vision system's field of view. Based on an object's 2D pose (i.e., position and orientation) in the field of view, and taking into account that it is disposed on the conveyor (thereby, rendering certain its "lie" and its distance from the vision system camera), the system applies 2D geometry to determine the object's exact 3D pose and/or conformance with expected appearance.

Examples using such 2D vision analysis are provided in prior works of the assignee hereof, including U.S. Pat. No. 6,748,104, entitled "Methods and apparatus for machine vision inspection using single and multiple templates or patterns", U.S. Pat. No. 6,639,624, entitled "Machine vision methods for inspection of leaded components", U.S. Pat. No. 6,301,396, entitled "Non-feedback-based machine vision methods for determining a calibration relationship between a camera and a moveable object", U.S. Pat. No. 6,137,893, entitled "Machine vision calibration targets and methods of determining their location and orientation in an image", U.S. Pat. No. 5,978,521, entitled "Machine vision methods using feedback to determine calibration locations of multiple cameras that image a common object", U.S. Pat. No. 5,978,080, entitled "Machine vision methods using feedback to determine an orientation, pixel width and pixel height of a field of view", U.S. Pat. No. 5,960,125, entitled "Nonfeedback-based machine vision method for determining a calibration relationship between a camera and a moveable object," U.S. Pat. No. 6,856,698, entitled "Fast high-accuracy multi-dimensional pattern localization", U.S. Pat. No. 6,850,646, entitled "Fast high-accuracy multi-dimensional pattern inspection", and U.S. Pat. No. 6,658,145, entitled "Fast high-accuracy multi-dimensional pattern inspection," to name a few.

With the increased reliance on robotics, everywhere from the factory floor to the home, the need for practical 3D vision systems has come to the fore. This is because, in many of these environments, objects subject to inspection are not necessarily constrained in overall position and lie, e.g., as might otherwise be the case with objects presented on a conveyor belt. That is, the precise 3D configuration of the object may be unknown.

To accommodate the additional degrees of freedom of pose and position in a 3D scene, 3D vision tools are helpful, if not necessary. Examples of these include U.S. Pat. No. 6,771,808, entitled, "System and method for registering patterns transformed in six degrees of freedom using machine vision", and U.S. Pat. No. 6,728,582, entitled, "System and method for determining the position of an object in three dimensions using a machine vision system with two cameras."

Other machine vision techniques have been suggested in the art. Some require too much processor power to be practical for real-time application. Others require that objects subject to inspection go though complex registration procedures and/or that, during runtime, many of the objects' features be simultaneously visible in the vision system field-of-view.

Outside the machine vision realm, the art also provides contact-based methods of determining 3D poses—such as using an x,y,z measuring machine with a touch sensor. However, this requires contact, is relatively slow and can require manual intervention. Electromagnetic wave-based methods for determining 3D poses have also been offered. These do not require physical contact, but suffer their own drawbacks, such as requiring the oft impractical step of affixing transmitters to objects that are subject to inspection.

An object of this invention is to provide improved methods and apparatus for machine vision and, more particularly, for three-dimensional machine vision.

A related object of this invention is to provide such methods and apparatus as have a range of practical applications including, but not limited to, manufacturing, quality control, and robotics.

A further related object of the invention is to provide such methods and apparatus as permit determination of, for example, position and pose in three-dimensional space.

A still further related object of the invention is to provide such methods and apparatus as impose reduced constraints, e.g., as to overall position and lie, of objects under inspection.

Yet still a further related object of the invention is to provide such methods and apparatus as minimize requirements for registration of objects subject to inspection.

Still yet a further object of the invention is to provide such methods and apparatus as can be implemented in present day and future machine vision platforms.

SUMMARY OF THE INVENTION

The foregoing are among the objects attained by the invention, which provides inter alia methods and apparatus for determining the pose, e.g., position along x-, y- and z-axes, pitch, roll and yaw (or one or more characteristics of the pose) of an object in three dimensions by triangulation of data gleaned from multiple images of the object.

Thus, for example, in one aspect, the invention provides a method for 3D machine vision in which, during a calibration step, multiple cameras disposed to acquire images of the object from different respective viewpoints are calibrated to discern a mapping function that identifies rays in 3D space emanating from each respective camera's lens that correspond to pixel locations in that camera's field of view. In a training step, functionality associated with the cameras is trained to recognize expected patterns in images to be acquired of the object. A runtime step triangulates locations in 3D space of one or more of those patterns from pixel-wise positions of those patterns in images of the object and from the mappings discerned during the calibration step.

Further aspects of the invention provide methods as described above in which the runtime step triangulates locations from images of the object taken substantially simultaneously by the multiple cameras.

Still further objects of the invention provide such methods including a re-calibration step in which runtime images of the object are used to discern the aforementioned mapping function, e.g., for a camera that has gone out of calibration. Thus, for example, if one camera produces images in which the patterns appear to lie at locations (e.g., when mapped to the 3D rays for that camera) inconsistent and/or in substantial disagreement with images from the other cameras (e.g,. when mapped using their respective 3D rays), pattern locations determined with the images from those other cameras can be used to re-calibrate the one camera.

Yet still further aspects of the invention provide methods as described above in which the calibration step includes positioning registration targets (such as bulls eyes, cross-hairs, or the like, e.g., on calibration plates or otherwise) at known positions in 3D space and recording—or otherwise characterizing, e.g., algorithmically—correlations between those positions and the pixel-wise locations of the respective targets in the cameras' fields of view. Related aspects of the invention provide such methods in which one or more of those registration targets, calibration plates, etc., are used to calibrate multiple cameras at the same time, e.g., by way of simultaneous imaging.

Other aspects of the invention provide methods as described above in which the calibration step includes discerning a mapping function for each camera that takes into account warping in the field of view.

Further aspects of the invention include methods as described above in which the training step includes training functionality associated with the cameras to recognize expected patterns, such as letters, numbers, other symbols (such as registration targets), corners, or other discernible features (such as dark and light spots) of the object and, for example, for which measurement techniques and search/detection models are known in the art.

Further related aspects of the invention provide such methods in which the training step includes training the aforementioned functionality as to the "model points,"—i.e., expected locations in 3D space of the patterns (e.g., in absolute or relative terms) on objects that will be inspected at runtime. In combination with the triangulated 3D locations discerned from those images, that information can be used, during the runtime step, to discern the pose of that object.

According to aspects of the invention, training as to expected locations of the patterns (i.e., model points) includes finding 2D poses of a reference point (or "origin") of each such pattern. For patterns that are expected to appear in the fields of view of two or more cameras, such reference points facilitate triangulation, as described below, for purposes of determining the position of those patterns (and, therefore, of the object) in 3D space.

Related aspects of the invention provide such methods in which training as to expected patterns includes utilizing—within the functionality associated with each camera—like models for training like expected patterns as between different cameras. This has the benefit of insuring that the reference points (or origins) for patterns found at runtime will coincide as between images obtained by those different cameras.

Further related aspects of the invention provide such methods in which training as to expected patterns includes utilizing—within the functionality associated with each camera—different models for like patterns as between different cameras. This facilitates finding patterns, e.g., when pose, viewing angle and/or obstructions alter the way that different cameras will image those patterns.

Related aspects of the invention provide such methods that include training the selection of reference points (or origins) of patterns so modeled. Such training can be accomplished, for example, by an operator, e.g., using a laser pointer or otherwise, in order to insure that those reference points (or origins) coincide as between images obtained by those different cameras.

Related aspects of the invention provide such methods in which the training step includes discerning the location of the patterns, for example, by utilizing a triangulation methodology similar to that exercised during the runtime phase. Alternatively, the expected (relative) locations of the patterns can be input by the operators and/or discerned by other measurement methodologies.

Further related aspects of the invention provide such methods in which the training step includes finding an expected pattern in an image from one (or more) camera(s) based on prior identification of that pattern in an image from another camera. Thus, for example, once the operator has identified an expected pattern in an image taken from one camera, the training step can include automatically finding that same pattern in images from the other cameras.

Still further aspects of the invention provide methods as described above in which the training step acquires multiple views of the object for each camera, preferably, such that the origins of the patterns found on those objects are consistently defined. To account for potential inconsistency among images, that produce the highest match score for the patterns can be used. This has the benefit of making the methodology more robust to finding parts in arbitrary poses.

Yet in still other aspects of the invention, the runtime step includes triangulating the position of one or more of the patterns in runtime images, e.g., using pattern-matching or other two-dimensional vision tools, and using the mappings discerned during the calibration phase to correlate the pixel-wise locations of those patterns in the respective camera's fields of view with the aforementioned 3D rays on which those patterns lie.

According to related aspects of the invention, triangulation of pattern location may be by "direct" triangulation, e.g., as where the location of a given pattern is determined from the point of intersection (or the point of least squares fit) of multiple 3D rays (from multiple cameras) on which that pattern lies. Alternatively, or in addition, triangulation may be "indirect," as where the location of a given pattern is determined not only from the ray (or rays) on which that pattern lies, but also from (i) the rays on which the other patterns lie, and (ii) the relative locations of those patterns to one another (e.g., as determined during the training phase).

Other aspects of the invention provide methods as described above in which functionality associated with the cameras "times out" if it fails to find an expected pattern in an image of an object—during training or runtime—thereby avoiding undue delay in position determination, e.g., if such a pattern is missing, occluded or otherwise not detected.

Yet still other aspects of the invention parallel the methods described above in which ID matrix codes (or other patterns whose appearance and/or positions are pre-defined or otherwise known) are used in place of the patterns discussed above. In these aspects of the invention, the training step is obviated or reduced. Instead, the 2D positions of those codes (or other patterns) can be discerned from the training-phase or runtime images, e.g., by vision tools designed for generic types of features, in order to map to 3D locations.

Still other aspects of the invention provide machine vision systems, e.g., including digital processing functionality and cameras, operating in accord with the methods above. These and other aspects of the invention are evident in the drawings and in the description that follows.

A still further related aspect of the invention provides such methods and apparatus as permit the inspection of an object, e.g. to determine and validate relative positions of portions thereof. Such methods and apparatus can be used, by way of non-limiting example, to support inspection and verification, for example, during an assembly, quality assurance, maintenance or other operation.

Further related aspects of the invention provide such methods and apparatus which infer the absence or misplacement of a part (or other portion) of an object in instances where one or more expected patterns (e.g., associated with that part/portion) are absent from runtime images or are present in those images, but at pixel locations that map to 3D locations that are not expected or desirable.

Still further related aspects of the invention provide such methods and apparatus wherein, during the runtime step, the positions of parts or other portions of the object are determined based on subsets of 3D locations corresponding to patterns found in runtime images, and wherein those 3D locations are used to determine expected locations of still further patterns. The expected locations of those further patterns can be compared with their actual 3D locations, e.g., as determined from the runtime images. Where positional differences identified in the comparison exceed a designated tolerance, the system can generate appropriate notifications (e.g., to the operator).

Advantages of systems and methods according to the invention are that they are easier to use and more practical than prior art systems approaches—yet, are vision-based and, hence, do not require contact with or prior preparation of objects subject to inspection. Such systems and methods (according to the invention) can be easily setup, and then trained using "show-and-go".

In addition, they provide speedy performance and robustness, e.g., with respect to missing and incorrect results. Thus, for example, methods and apparatus according to aspects of the invention can determine the pose of objects even though some patterns are not found in some (and, under some circumstances, any) of the runtime images, e.g., because the patterns are occluded from view by one or more cameras or because images of those patterns could not be timely acquired. By way of further example, methods and apparatus according to aspects of the invention provide robustness with respect to incorrect results (e.g., caused by misaligned cameras) by triangulating using subsets of the 3D locations corresponding patterns found in runtime images: if one of the subsets results in a lower sum-squared error, that subset can be used for position triangulation, rather than all of the patterns.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
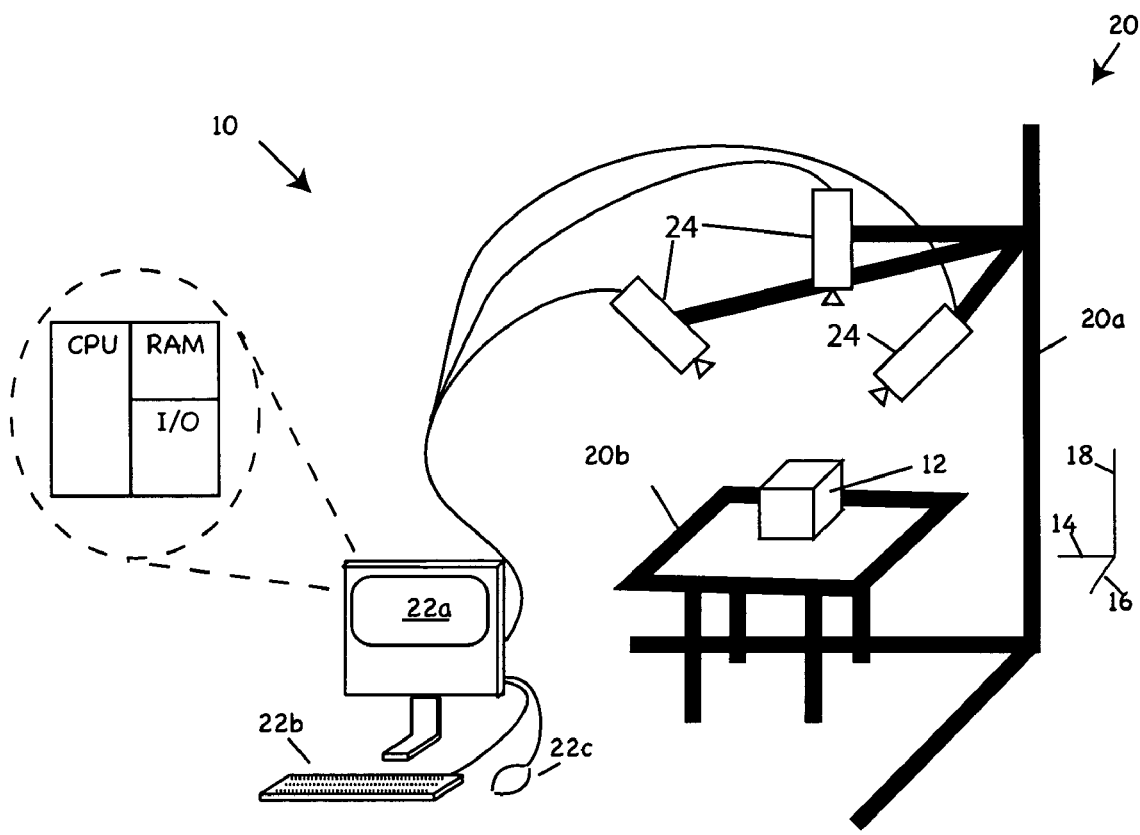
FIG. 1 depicts a digital data processor configured for practice of the invention.

FIG. 1 depicts a machine vision system 10 according to the invention capable of determining the pose of an object 12 in three dimensions by triangulation of data gleaned from multiple images of the object. In the illustrated embodiment, the pose is defined position and orientation of the object in three-dimensional space—or, more precisely, the position of the object along x-, y- and z-axes 14, 16, 18 as well the object's pitch, roll and yaw relative thereto. In other embodiments, pose might be limited to subsets of these spatial characteristics (e.g., position along axis 16 and yaw; position along axes 14-18; roll; etc.). Illustrated axes 14-18 are aligned with a frame 20 of the vision system 10; though, in other embodiments, other frames of reference may be used. Frame 20 of the illustrated embodiment is figuratively represented by camera mounts 20a and platform 20b depicted with heavy shading; though, in other embodiments, other or no such members need be employed.

System 10 further includes digital data processor 22 and image acquisition devices 24. Digital data processor 22, here, depicted as an iMac® G5 personal computer for simplicity, may be a mainframe computer, workstation, personal computer (e.g., running a Windows®/Intel Pentium 4 platform, or otherwise), dedicated vision computer, embedded processor or other digital data device, running an proprietary, open source or other operating system, that is programmed or otherwise configured in accord with the teachings hereof to determine the pose of object 12 from images supplied by acquisition devices 24. The digital data processor may include a display 22a, as shown, as well as keyboard 22b, mouse 22c and other input/output devices, all of the type known in the art.

Image acquisition devices 24 may be machine vision cameras, video cameras, still cameras or other devices capable of acquiring images of object 12 in the visible or other relevant spectrum. Without loss of generality, in the text that follows the devices 24 are typically referred to as "cameras"— though, in practice, they may comprise any manner of image acquisition functionality. In the illustrated embodiment, three such devices 24 are shown, though, in practice any plurality of devices (e.g., two or more) may be employed. Those devices are disposed to acquire images of the object 24 from different respective viewpoints. It will also be appreciated to those skilled in the art that, in some embodiments, the 3D pose of an object under inspection can also be determined using images from a single such device 24 and, hence, that not all embodiments require images from multiple cameras.

Digital data processor 22 further includes a central processor (CPU), memory (RAM) and input/output (I/O) functionality of the type known in the art, albeit programmed for operation in accord with the teachings hereof.

Figure 2:
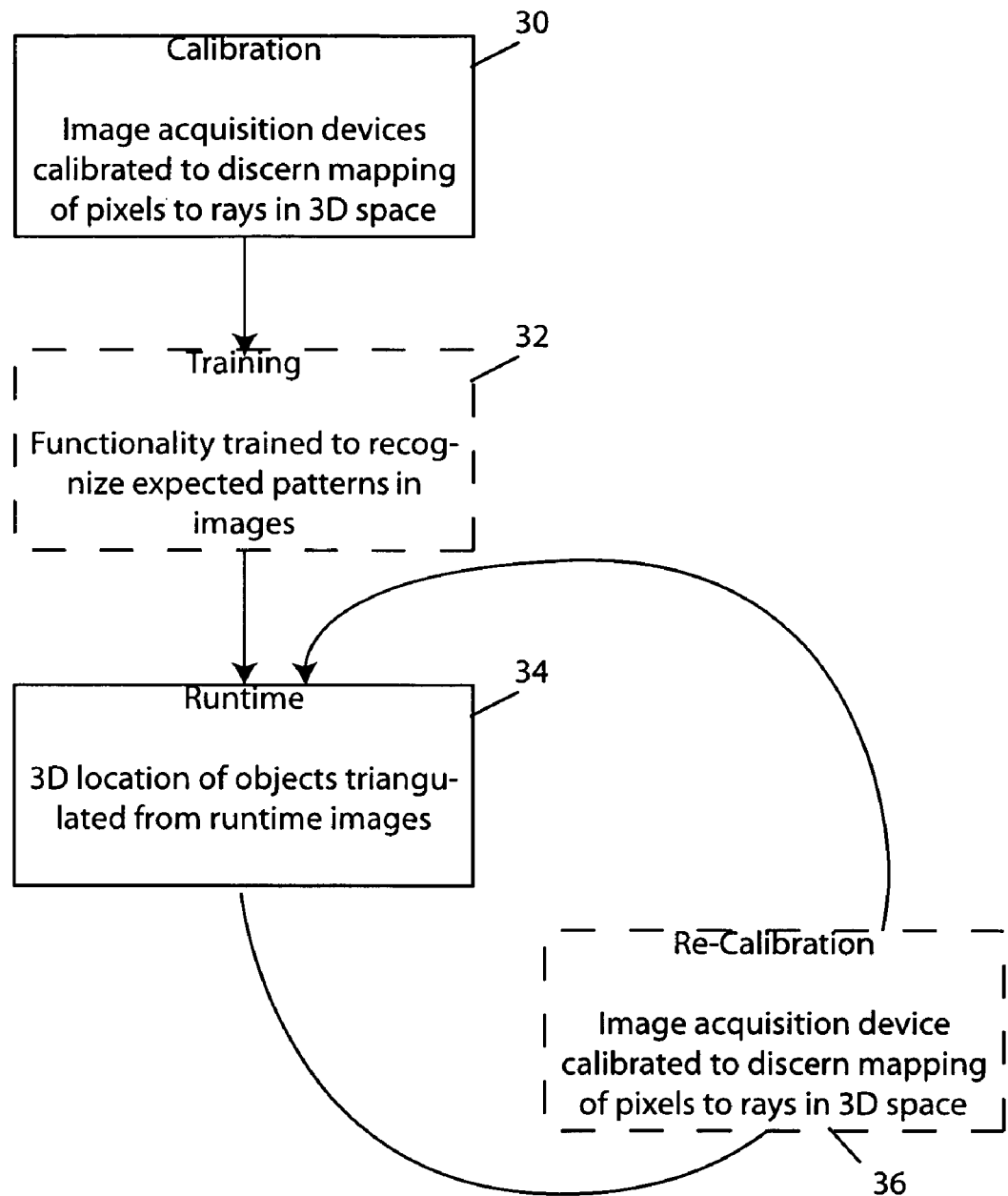
FIG. 2 is a flow-chart depicting operation of a system according to the invention.

Particularly, in the illustrated embodiment, these are configured to provide 3D machine vision in accord with the method shown in FIG. 2. There, in calibration step 30, each of the multiple cameras 24 is calibrated to discern a respective mapping function that identifies rays in 3D space emanating from that camera's lens and that correspond to pixel locations in that camera's field of view.

Figure 3:
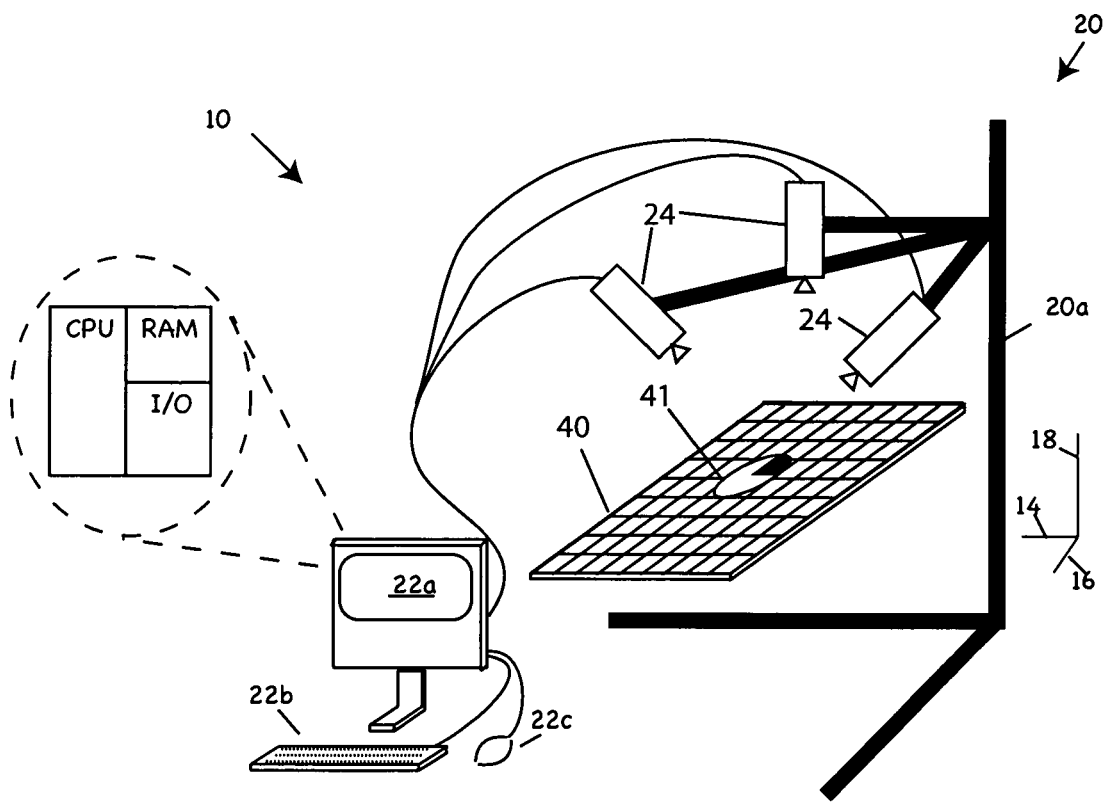
FIG. 3 depicts calibration of a system according to the invention.
Figure 4A:
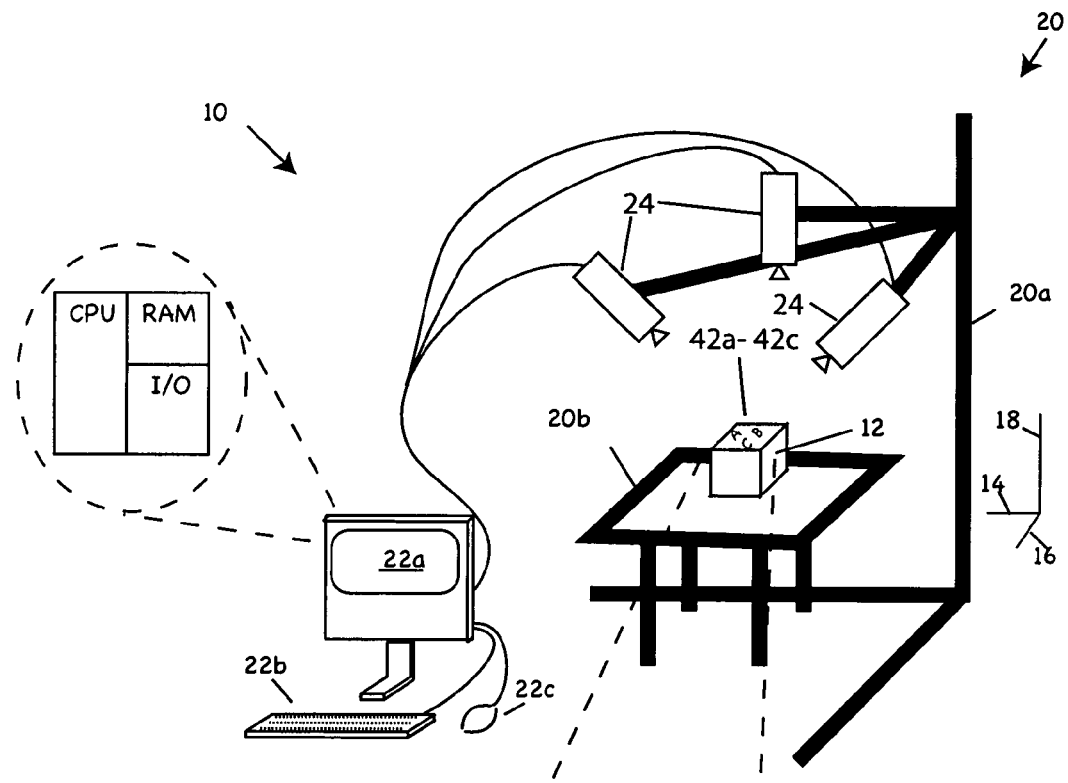
FIGS. 4A-4B depict training and/or runtime operation of a system according to the invention.
Figure 4B:
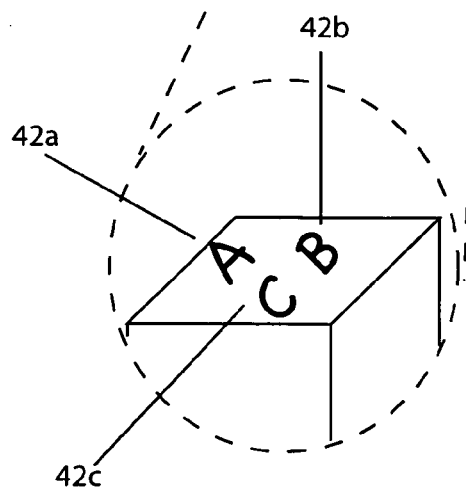

Referring to FIG. 3, in this regard, the calibration step includes positioning registration targets (such as bulls eyes, cross-hairs, or the like, e.g., on calibration plates 40 or otherwise) at known positions in 3D space and recording—or otherwise characterizing, e.g., algorithmically—correlations between those positions and the pixel-wise locations of the respective targets in the cameras' fields of view. Preferably, this mapping takes into account warping in the field of view of each respective camera 24.

In the illustrated embodiment, the registration targets, calibration plates 40, etc., are used to calibrate multiple cameras 24 at the same time, e.g., by way of simultaneous imaging. Thus, by way of example, the operator can place a target in the field of view of two or more of the image acquisition devices 24, which simultaneously image the target for calibration purposes. Where calibration plates 40, or the like, are used for calibration, they preferably show a fiducial 41 (e.g., a unique pattern which differs from the uniform checkerboard pattern) at an origin so that all acquisition devices 24 can be calibrated with respect to the same unique reference point with specified orientation. By so calibrating the devices 24 in a consistent manner, they can all be used to map from their image coordinates (e.g., the pixel-wise locations of pattern origins) to a common reference point or frame. Preferred such fiducials are asymmetric, as in the case of the L-shaped fiducial in the drawing.

Underlying methodologies and apparatus for such calibration are taught, by way of non-limiting example, in U.S. Pat. No. 6,748,104, entitled "Methods and apparatus for machine vision inspection using single and multiple templates or patterns", U.S. Pat. No. 6,639,624, entitled "Machine vision methods for inspection of leaded components", U.S. Pat. No. 6,301,396, entitled "Nonfeedback-based machine vision methods for determining a calibration relationship between a camera and a moveable object", U.S. Pat. No. 6,137,893, entitled "Machine vision calibration targets and methods of determining their location and orientation in an image", U.S. Pat. No. 5,978,521, entitled "Machine vision methods using feedback to determine calibration locations of multiple cameras that image a common object", U.S. Pat. No. 5,978,080, entitled "Machine vision methods using feedback to determine an orientation, pixel width and pixel height of a field of view", U.S. Pat. No. 5,960,125, entitled "Nonfeedback-based machine vision method for determining a calibration relationship between a camera and a moveable object," U.S. Pat. No. 6,856,698, entitled "Fast high-accuracy multi-dimensional pattern localization", U.S. Pat. No. 6,850,646, entitled "Fast high-accuracy multi-dimensional pattern inspection", and U.S. Pat. No. 6,658,145, entitled "Fast high-accuracy multi-dimensional pattern inspection," the teachings of all of which are incorporated herein by reference. The methodologies and apparatus described in the latter three patents are referred to elsewhere herein by the name "PatMax."

In an optional training step 32, a module (e.g., a code sequence, subroutine, function, object, other data structure and/or associated software, or other functionality) associated with each respective camera 24 is trained to recognize expected patterns in images to be acquired, during runtime, of the object 12. These may be letters, numbers, other symbols (such as registration targets), corners, or other features (such as dark and light spots) that are expected to be discernible in the runtime images of the object 12 and, for example, for which measurement techniques and search/detection models are known in the art. Those patterns may be permanently part of, or affixed to, the object. However, they may also be temporary, e.g., as in the case of removable calibration targets. Indeed, they need not be even physically associated with the object. For example, they may be optically or otherwise projected onto objects that are imaged during training and/or runtime phases, e.g., by a laser or other apparatus.

In addition to training the modules or other functionality associated with each camera 24 to recognize pattern, training step 32 of the illustrated embodiment includes training them as to the model point locations, i.e., the expected locations of the patterns, e.g., relative to one another (i.e., in 3D space) on objects that will be inspected during runtime. This can be, for example, by utilizing a triangulation methodology similar to that exercised during the runtime phase. Alternatively, the expected (relative) locations of the patterns can be input by the operator and/or discerned by other measurement methodologies (e.g., rulers, calipers, optical distance gauges, and so forth).

Regardless of whether the triangulation or other methodologies are used, the training step 32 preferably includes training the modules or other functionality or other functionality associated with each camera 24 as to a reference point (or "origin") of each such trained pattern. For patterns that are expected to appear in the fields of view of two or more cameras, training as to such reference points facilitate direct and indirect triangulating of the position of those patterns and/or of the object in 3D space.

In the illustrated embodiment, such training can be effected by using like models (e.g., "PatMax", or so forth) for training like expected patterns as between different cameras 24. This has the benefit of insuring that the reference points (or origins) for patterns found at runtime will coincide as between images obtained by those different cameras.

Where pose, viewing angle and/or obstructions alter the way that different cameras 24 will view like patterns, such training can include utilizing different models (for like patterns) as between different cameras. Since different models may tend to identify different reference points for like patterns, the illustrated embodiment permits an operator to train the selection of like reference points for like patterns.

This can be accomplished, by way of example, during training step 32, by simultaneously acquiring images of the pattern from multiple cameras 24 (to be used as a template for searching in step 34) and, then, shining a laser pointer at the object. From images acquired with the laser shining, the 3D location of the laser point can be computed, thereby, defining coincident origins on all images of the patterns. (Though described, here, with respect to use disparate models for pattern training, this technique can be applied, as well, in instances where like models are used). To this end, using the images with and without the superfluous laser pointer spot, auto Thresholding and blob analysis can be run to find the center of the spot in all the images, and thereby to determine consistent coincident origins. As discussed elsewhere herein, triangulation can be used to get the 3D position of the spot, thereby, permitting use of this technique for multiple patterns on the (training) object provided, for example, that it does not move.

According to one preferred practice of the invention, the training step 32 includes finding an expected pattern in an image from one (or more) camera(s) 24 based on prior identification of that pattern in an image from another camera. Thus, for example, once the operator has identified an expected pattern in an image taken from one camera, the training step can include automatically finding that same pattern in images from the other cameras.

In preferred embodiments, step 32 includes acquiring multiple views of the object for each camera 24, preferably, such that the origins of the patterns found on those objects are consistently defined. To account for potential inconsistency among images, those that produce the highest match score for the patterns can be used. This has the benefit of making the methodology more robust to finding parts in arbitrary poses.

As noted above, the training step 32 is optional: in some embodiments of the invention, it is employed in reduced capacity or not at all. For example, if the patterns expected at runtime are susceptible to search via a blob model (e.g., one that looks for bright features), then no patterns training is required—though, position training of the type described above will still be employed. Such is also true, by way of further example, if the patterns are ID matrix codes (or other patterns whose appearance and/or positions are pre-defined or otherwise known) are used in place of the trainable patterns discussed above. Here, the 2D positions of those codes (or other patterns) are discerned from the training-phase or runtime images, e.g., by vision tools designed for generic types of features, in order to map to 3D locations. Such implementations of the invention are useful because industrial parts might always have ID Matrix codes, and multiple training-less sensors could thereby output 3D positions of the ID Matrix code. Furthermore, since an ID Matrix code spans a rectangular area all of the sensors could output the 2D positions of the 4 corners; furthermore, if the ID Matrix is printed with a particular process, then we can know the 3D positions (by virtue of the found size/type of the code) and compute 3D pose.

In runtime step 34, the digital data processor 22 triangulates locations in 3D space of one or more of patterns 42a-42c on the object 12 based on pixel-wise positions of representations of those patterns in runtime images of the object 12 and from the mappings discerned during calibration step 32. In the illustrated embodiment, those runtime images are preferably acquired simultaneously, or substantially simultaneously, of the object 12 by the devices 24. In this regard, substantially simultaneously refers to image acquisition occurring so nearly close in time that movement of the object 12, devices 24, frame 20, or otherwise, does not substantially affect the pixel-wise location of patterns in the runtime images and/or mappings determined therefrom. Such simultaneous acquisition can be achieved by firing the cameras 24 at the same time (or nearly so) or by other means—including, for example, stroboscopically illuminating the imaged object while the camera 24 shutters are open.

In the illustrated embodiment, position triangulation is accomplished using pattern matching or other two-dimensional vision tools to discern the pixel-wise location of patterns in the runtime images, and using the mappings discerned during the calibration phase to correlate the pixel-wise locations of those patterns in the respective camera's 24 fields of view with the aforementioned 3D rays on which those patterns lie. Examples using such 2D vision tools include aforementioned, incorporated-by-reference U.S. Pat. Nos. 6,748,104, 6,639,624, 6,301,396, 6,137,893, 5,978,521, 5,978,080, 5,960,125, 6,856,698, 6,850,646, and 6,658,145.

Triangulation of pattern location may be by "direct" triangulation, e.g., as where the location of a given pattern is determined from the point of intersection of multiple 3D rays (from multiple cameras) on which that pattern lies. Alternatively, or in addition, triangulation may be "indirect," as where the location of a given pattern is determined not only from the ray (or rays) on which that pattern lies, but also from (i) the rays on which the other patterns lie, and (ii) the relative locations of those patterns to one another (e.g., as determined during the training phase) on the imaged object.

In the illustrated embodiment, direct and/or indirect triangulation can utilize "least squares fit" or other such methodologies for finding points of intersection (or nearest intersection) as between or among multiple 3D rays (from multiple cameras 24) on which pattern(s) appear to lie. For example, where images acquired from two or more cameras 24 indicate that a given pattern (and, more precisely, the apparent origin of that pattern) lies on two or more rays, a least squares fit methodology can be employed to determine a location of intersection of those rays in 3D space or a nearest point thereto (i.e., a point in space that lies nearest those rays). Likewise, where images from the cameras 24 indicate origins for multiple patterns on multiple rays, a least squares fit can be employed using the model points of those patterns on the object to determine the most likely locations of the patterns and/or the object itself.

The illustrated embodiment utilizes an optimizer (or "solver") to find the least squares (or root mean square) fit of rays and patterns. This can be a general purpose tool of the type available in the art and/or it can operate in the manner detailed below. In any event, during runtime step 34, the solver is supplied with definitions of the 3D rays on which the patterns (and, more precisely, the pattern origins) identified from the runtime images lie, as well as (where relevant) the locations or relative locations of the patterns on the object.

Typically, this information defines an over-constrained system (i.e., more information is supplied by way of ray definitions and relative pattern locations on the object than is necessary to infer the actual locations), a fact on which the illustrated system capitalizes for purposes of robustness. Thus, for example, the runtime step 34 can determine object pose, e.g., even where patterns are missing from the object or its runtime image (e.g., as where a pattern is occluded from one or more camera views, or where lighting or other conditions to not permit timely acquisition of a pattern image). And, by way of further example, the runtime step 34 can include trying subsets of the pattern origins (and, more precisely, subsets of the locations corresponding to pattern origins) found by the acquisition devices 24 in order to minimize the root mean square (RMS) error of the fit between the rays and the model points or the triangulation of the rays. If one of the subsets has a lower sum squared error, that subset can be used for position triangulation, rather than all of the pattern origins.

Typically, this information defines an over-constrained system (i.e., more information is supplied by way of ray definitions and relative pattern locations on the object than is necessary to infer the actual locations), a fact on which the illustrated system capitalizes for purposes of robustness. Thus, for example, the runtime step 34 can determine object pose, e.g., even when certain patterns are intentionally omitted from consideration (e.g., so as to inspect/validate a pattern's position by comparing it to the position predicted by the other found patterns).

And, by way of further example, the runtime step 34 can include trying subsets of the pattern origins (and, more precisely, subsets of the locations corresponding to pattern origins) found by the acquisition devices 24 in order to minimize the root mean square (RMS) error of the fit between the rays and the model points or the triangulation of the rays. Then, the step can extrapolate the 3D position of the patterns which were not included in the subset (i.e., that were intentionally omitted as mentioned above) and predict the 2D image positions in their respective cameras. The predicted image position can be compared to the actual measured image position: if the distance between the predicted image position and the actual measured image position exceeds some user-specified distance tolerance, then the system can generate an appropriate warning or other notification. Alternatively, or in addition, the extrapolated 3D positions of the omitted patterns can be compared against 3D positions determined by triangulation; again, where the distance between extrapolated (predicted) and actual positions differ, the runtime step 34 can include generating an appropriate warning or other notification.

In order to improve the speed of pattern recognition, during both training and runtime phases, the illustrated embodiment can exploit the found position of one pattern to limit the search degrees of freedom for the other pattern. For example, if a first camera 24 finds the pattern at 15 degrees, and another camera is approximately in the same orientation as the first camera, then it may only need to look for the pattern at orientations 15+/−10 degrees. In addition, given the origin's position from one camera, we know that the origin will lie along a 3D ray; thereby, we can project that ray onto the second camera's field of view, and only look for the pattern along that line.

If two patterns are confusable (i.e., there are two instances similar to the pattern in the camera's field of view), the illustrated embodiment can try all of the different possible correspondences. For example, using the technology described in aforementioned, incorporated-by-reference U.S. Pat. No. 6,856,698, entitled "Fast high-accuracy multidimensional pattern localization", U.S. Pat. No. 6,850,646, entitled "Fast high-accuracy multi-dimensional pattern inspection", and U.S. Pat. No. 6,658,145, and entitled "Fast high-accuracy multi-dimensional pattern inspection," patterns such as the character sequences "P", "ST", "It", and "Notes" (from a POST-IT® Notes label) are all different, so when a match is found, we know it is a correct match.

Alternatively, the machine vision tool known as "blob" analysis can be used to find patterns (e.g., if they are dark holes). In this case, it could be hypothesized that blob #1 corresponds to 3Dmodel point 1, and blob#2 corresponds to 3Dmodel point2, etc. If that doesn't work, then the analysis can move on to the next hypothesis: that blob #2 corresponds to 3D model point #2, and blob#1 corresponds to 3D model point #1.

A more complete understanding of the triangulation process of the illustrated embodiment may be appreciated from the discussion that follows.

To intersect n 3D rays (i.e., to find the point which minimizes the sum squared distance to n 3D rays), first characterize each ray as two separate orthogonal planes (since the squared distance from a point to a ray is the sum of the squared distances of the point to two orthogonal planes intersecting that ray). This is exemplified by the C++ code below:

```
static void solveMinimizeSquareErrorEquations(
                    const cmStd vector<cc3Vect> &eqs,
                    const cmStd vector<double> &val,
                    cc3Vect &ans,
                    double &rmsError)
{
  int size = eqs.size( );
  assert(size==val.size( ));
  ccNMMatrix func(size,3);
  ccNMMatrix vals(size,1);
  int i;
  for (i = 0; i < size; ++i)
  {
    func.element(i,0,eqs[i].x( ));
    func.element(i,1,eqs[i].y( ));
    func.element(i,2,eqs[i].z( ));
    vals.element(i,0,val[i]);
  }
  ccNMMatrix func2 = func.Tmultiply(func);
  ccNMMatrix vals2 = func.Tmultiply(vals);
  double cnum;
  ccNMMatrix result =
    ccNMMatrix::solve (func2,vals2,true/*symmetric*/,
    cnum,HUGE_VAL);
  // throw in degenerate cases
  if (func2.conditionNumber(false) > 1e12)
```

```
    throw ccMathError::Singular( );
  ans = cc3Vect(result.element(0,0),
                result.element(1,0),
                result.element(2,0));
  double sumSqError = 0;
  for (i = 0; i < size; ++i)
  {
    double error = eqs[i].dot(ans)−val[i];
    sumSqError += error*error;
  }
  rmsError = cfSqrt(sumSqError/size);
}
void cfComputePerpendiculars(const cc3Vect &start1,
                             const cc3Vect &end1,
                             cc3Vect &perp1,
                             cc3Vect &perp2)
{
  cc3Vect diff = end1 − start1;
  cc3Vect axes[3] = {cc3Vect(1,0,0),
                     cc3Vect(0,1,0),
                     cc3Vect(0,0,1)};
  cc3Vect crosses[3];
  double lens[3];
  int i;
  for (i = 0; i < 3; ++i)
    crosses[i] = diff.cross(axes[i]);
  for (i = 0; i < 3; ++i)
    lens[i] = crosses[i].dot(crosses[i]);
  int j;
  for (i = 0; i < 2; ++i)
    for (j = i+1; j < 3; ++j)
      if (lens[i] < lens[j])
      {
        double tmp = lens[i];
        lens[i] = lens[j];
        lens[j] = tmp;
        cc3Vect cross = crosses[i];
        crosses[i] = crosses[j];
        crosses[j] = cross;
      }
  perp1 = crosses[0] * 1./lens[0];
  perp2 = crosses[1] * 1./lens[1];
}
static void intersectLinesInThreeSpace
(const cmStd vector<cc3DLineSeg> &segs,
 cc3Vect &intersection,
 double &rmsError)
{
  // Find point which minimizes total squared error between
  // segs.size( )*2 planes
  int size = segs.size( );
  cmStd vector<cc3Vect> eqs(size*2);
  cmStd vector<double> vals(size*2);
  int i;
  for (i = 0; i < size; ++i)
  {
    cfComputePerpendiculars(segs[i].p1( ),segs[i].p2( ),
    eqs[i*2],eqs[i*2+1]);
    vals[i*2] = segs[i].p1( ).dot(eqs[i*2]);
    vals[i*2+1] = segs[i].p1( ).dot(eqs[i*2+1]);
  }
  solveMinimizeSquareErrorEquations(eqs,vals,intersection,rmsError);
}
```

To solve for the pose which best maps the 3D points onto the corresponding 3D rays, we can say that we use the following equations (which are expressed in the Maple math package, which is commercially available from Maplesoft, a division of Waterloo Maple) which is used to generate optimized C code.

The approach solves for the pose (which is expressed in terms of the variables a,b,c,d,tx,ty,tz) which minimizes the sum squared error between points p (which are expressed as x,y,z) and planes expressed as (px, py, pz, pt). Note that each $3d$ ray corresponds to two such plane constraints. The approach computes the sum squared error by summing up the coefficients of the algebraic error function. And then, the approach solves for the optimal a,b,c,d,tx,ty,tz using gradient descent. Note that since there are 7 variables (a,b,c,d,tx,ty,tz) and only 6 degrees of freedom, we try 4 different cases—where a is set to 1 and the variables are b,c,d; where b is set to 1 and the variables are a,c,d; where c is set to 1 and the variables are a,b,d; and where d is set to 1 and the variables are a,b,c.

```
quatRot :=
  matrix(4,4,
    [[a*a+b*b-c*c-d*d,2*b*c-2*a*d,2*a*c+2*b*d,tx],
    [2*a*d+2*b*c,a*a-b*b+c*c-d*d,2*c*d-2*a*b,ty],
    [2*b*d-2*a*c,2*a*b+2*c*d,a*a-b*b-c*c+d*d,tz],
    [0,0,0,a*a+b*b+c*c+d*d]]);
val := matrix(1,4,[x,y,z,1]);
dot := matrix(1,4,[px,py,pz,pt]);
pos := multiply(quatRot,transpose(val));
unit := (a*a+b*b+c*c+d*d);
weightMat := multiply(dot,pos);
weight := weightMat[1,1]/unit;
weightSq := expand(weight*weight);
weightSqDA := simplify(expand(diff(weightSq,a)*unit*unit));
weightSqDB := simplify(expand(diff(weightSq,b)*unit*unit));
weightSqDC := simplify(expand(diff(weightSq,c)*unit*unit));
weightSqDD := simplify(expand(diff(weightsq,d)*unit*unit));
weightSqDTX := simplify(expand(diff(weightSq,tx)*unit*unit));
weightSqDTY := simplify(expand(diff(weightSq,ty)*unit*unit));
weightSqDTZ := simplify(expand(diff(weightSq,tz)*unit*unit));
```

The foregoing will be further appreciated in view of the following, in which GenericPoly( ) is a function which extracts the coefficients of a function. Thus, if the function is x*x+2*x*y+y*y, then the generic function is f0x2y0*x*x+f0x1y1*x*y+f0x0y2*y*y where f0x2y0=1, f0x1y1=2, f0x0y2=1. GenericPoly( ) is included in MARS, a Maple Matlab Resultant Solver system publicly and freely available, e.g., by way of non-limiting example from www.cs.unc.edu/~geom/MARS.

```
read('genericpoly.map');
genPoly:=
GenericPoly(expand(eval(weightMat[1,1]*weightMat[1,1])),
array(1..7,[a,b,c,d,tx,ty,tz]),'f');
genPolyDA := simplify(expand(unit*diff(eval(genPoly[1]),a)-
eval(genPoly[1])*4*a));
genPolyDB := simplify(expand(unit*diff(eval(genPoly[1]),b)-
eval(genPoly[1])*4*b));
genPolyDC := simplify(expand(unit*diff(eval(genPoly[1]),c)-
eval(genPoly[1])*4*c));
genPolyDD := simplify(expand(unit*diff(eval(genPoly[1]),d)-
eval(genPoly[1])*4*d));
genPolyDTX := simplify(expand(diff(eval(genPoly[1]),tx)));
genPolyDTY := simplify(expand(diff(eval(genPoly[1]),ty)));
genPolyDTZ := simplify(expand(diff(eval(genPoly[1]),tz)));
C(genPolyDA);
C(genPolyDB);
C(genPolyDC);
C(genPolyDD);
C(genPolyDTX);
C(genPolyDTY);
C(genPolyDTZ);
```

(Note that since the error function is not just derivative (weightMat*weightMat) but it is actually (a*a+b*b+c*c+d*d)*derivative(weightMat*weightMat) minus 4*a*weightMat*weightMat (for computing the partial derivative with respect to a) (which is written as:

unit*diff(eval (genPoly[1]),a)-eval (genPoly[1])* 4*a));)

because of the chain rule for quotients:

deriv $(F(x)/G(x))==(G(x)*F'(x)-F(x)*G'(x))/(G(x)*G(x))$ note that we can ignore the square of the denominator (in the denominator of the chain rule for partial derivatives) for this analysis because the denominator (a*a+b*b+c*c+d*d) applies uniformly to all partial derivatives:

$d((a*a+b*b+c*c+d*d)^2)/da=4*a*(a*a+b*b+c*c+d*d))$

By way of further explanation of the foregoing, numerical gradient descent methods make use of an error function, as well as derivatives of that error function. The derivates of an error function can be computed numerically or symbolically. For numerically-computed derivates, one can simply change one of the variables by a small amount, and then recompute the error function, and thusly numerically compute the derivative. For symbolically computed derivatives, one needs a symbolic function corresponding to the derivative—which we have in this case because we have the algebraic expressions describing the error function, and we can symbolically differentiate that algebraic error function.

In the illustrated embodiment, a C data structure keeps all of the coefficients for the algebraic expression, as follows:

```
typedef struct ptRayGenericPoly
{
    double fa0b0c0d0tx0ty0tz2 ;
    double fa0b0c0d0tx0ty1tz1 ;
    double fa0b0c0d0tx0ty2tz0 ;
    double fa0b0c0d0tx1ty0tz1 ;
    double fa0b0c0d0tx1ty1tz0 ;
    double fa0b0c0d0tx2ty0tz0 ;
    double fa0b0c0d2tx0ty0tz1 ;
    double fa0b0c0d2tx0ty1tz0 ;
    double fa0b0c0d2tx1ty0tz0 ;
    double fa0b0c0d4tx0ty0tz0 ;
    double fa0b0c1d1tx0ty0tz1 ;
    double fa0b0c1d1tx0ty1tz0 ;
    double fa0b0c1d1tx1ty0tz0 ;
    double fa0b0c1d3tx0ty0tz0 ;
    double fa0b0c2d0tx0ty0tz1 ;
    double fa0b0c2d0tx0ty1tz0 ;
    double fa0b0c2d0tx1ty0tz0 ;
    double fa0b0c2d2tx0ty0tz0 ;
    double fa0b0c3d1tx0ty0tz0 ;
    double fa0b0c4d0tx0ty0tz0 ;
    double fa0b1c0d1tx0ty0tz1 ;
    double fa0b1c0d1tx0ty1tz0 ;
    double fa0b1c0d1tx1ty0tz0 ;
    double fa0b1c0d3tx0ty0tz0 ;
    double fa0b1c1d0tx0ty0tz1 ;
    double fa0b1c1d0tx0ty1tz0 ;
    double fa0b1c1d0tx1ty0tz0 ;
    double fa0b1c1d2tx0ty0tz0 ;
    double fa0b1c2d1tx0ty0tz0 ;
    double fa0b1c3d0tx0ty0tz0 ;
    double fa0b2c0d0tx0ty0tz1 ;
    double fa0b2c0d0tx0ty1tz0 ;
    double fa0b2c0d0tx1ty0tz0 ;
    double fa0b2c0d2tx0ty0tz0 ;
    double fa0b2c1d1tx0ty0tz0 ;
    double fa0b2c2d0tx0ty0tz0 ;
    double fa0b3c0d1tx0ty0tz0 ;
    double fa0b3c1d0tx0ty0tz0 ;
    double fa0b4c0d0tx0ty0tz0 ;
    double fa1b0c0d1tx0ty0tz1 ;
    double fa1b0c0d1tx0ty1tz0 ;
    double fa1b0c0d1tx1ty0tz0 ;
    double fa1b0c0d3tx0ty0tz0 ;
    double fa1b0c1d0tx0ty0tz1 ;
    double fa1b0c1d0tx0ty1tz0 ;
    double fa1b0c1d0tx1ty0tz0 ;
    double fa1b0c1d2tx0ty0tz0 ;
    double fa1b0c2d1tx0ty0tz0 ;
    double fa1b0c3d0tx0ty0tz0 ;
    double fa1b1c0d0tx0ty0tz1 ;
    double fa1b1c0d0tx0ty1tz0 ;
```

```
        double fa1b1c0d0tx1ty0tz0 ;
        double fa1b1c0d2tx0ty0tz0 ;
        double fa1b1c1d1tx0ty0tz0 ;
        double fa1b1c2d0tx0ty0tz0 ;
        double fa1b2c0d1tx0ty0tz0 ;
        double fa1b2c1d0tx0ty0tz0 ;
        double fa1b3c0d0tx0ty0tz0 ;
        double fa2b0c0d0tx0ty0tz1 ;
        double fa2b0c0d0tx0ty1tz0 ;
        double fa2b0c0d0tx1ty0tz0 ;
        double fa2b0c0d2tx0ty0tz0 ;
        double fa2b0c1d1tx0ty0tz0 ;
        double fa2b0c2d0tx0ty0tz0 ;
        double fa2b1c0d1tx0ty0tz0 ;
        double fa2b1c1d0tx0ty0tz0 ;
        double fa2b2c0d0tx0ty0tz0 ;
        double fa3b0c0d1tx0ty0tz0 ;
        double fa3b0c1d0tx0ty0tz0 ;
        double fa3b1c0d0tx0ty0tz0 ;
        double fa4b0c0d0tx0ty0tz0 ;
} ptRayGenericPoly;
```

The illustrated embodiment also utilizes a function which adds to the coefficients of the algebraic expression (those functions take as input a 3D point (x,y,z) and a corresponding plane—characterized by px,py,pz,pt):

```
void ptRayGenericPoly_addToVals(ptRayGenericPoly *vals,
                                double x,
                                double y,
                                double z,
                                double px,
                                double py,
                                double pz,
                                double pt);
```

The illustrated embodiment also utilizes a function which computes the error at a given pose (a,b,c,d,tx,ty,tz) where (a,b,c,d) are quaternion representation of the 3D rotation (roll,pitch,yaw), and (tx,ty,tz) are the translation:

```
double ptRayGenericPoly_eval(const ptRayGenericPoly *vals,
                             double a,
                             double b,
                             double c,
                             double d,
                             double tx,
                             double ty,
                             double tz);
```

The illustrated embodiment also provide functions which compute the derivatives:

```
double ptRayGenericPoly_DA(const ptRayGenericPoly *vals,
                           double a,
                           double b,
                           double c,
                           double d,
                           double tx,
                           double ty,
                           double tz);
double ptRayGenericPoly_DB(const ptRayGenericPoly *vals,
                           double a,
                           double b,
                           double c,
                           double d,
                           double tx,
                           double ty,
                           double tz) ;
double ptRayGenericPoly_DC(const ptRayGenericPoly *vals,
                           double b,
                           double c,
                           double d,
                           double tx,
                           double ty,
                           double tz);
double ptRayGenericPoly_DD(const ptRayGenericPoly *vals,
                           double a,
                           double b,
                           double c,
                           double d,
                           double tx,
                           double ty,
                           double tz);
double ptRayGenericpoly_DTX(const ptRayGenericPoly *vals,
                            double a,
                            double b,
                            double c,
                            double d,
                            double tx,
                            double ty,
                            double tz);
double ptRayGenericPoly_DTY(const ptRayGenericPoly *vals,
                            double a,
                            double b,
                            double c,
                            double d,
                            double tx,
                            double ty,
                            double tz);
double ptRayGenericPoly_DTZ(const ptRayGenericPoly *vals,
                            double a,
                            double b,
                            double c,
                            double d,
                            double tx,
                            double ty,
                            double tz);
```

For example, the function which adds to the coefficients can be expressed in a manner consistent with the exemplary excerpts that follow; the complete function is evident in view of the teachings hereof and the Maple code provided:

```
void ptRayGenericPoly_addToVals(ptRayGenericPoly *vals,
                                double x,
                                double y,
                                double z,
                                double px,
                                double py,
                                double pz,
                                double pt)
{
    double x_2 = x*x;
    double y_2 = y*y;
    double z_2 = z*z;
    double px_2 = px*px;
    double py_2 = py*py;
    double pz_2 = pz*pz;
```

-continued

```
double pt_2 = pt*pt;
vals->fa0b0c0d0tx0ty0tz2 += pz_2;
vals->fa0b0c0d0tx0ty1tz1 += 2*py*pz;
vals->fa0b0c0d0tx0ty2tz0 += py_2;
vals->fa0b0c0d0tx1ty0tz1 += 2*pz*px;
vals->fa0b0c0d0tx1ty1tz0 += 2*py*px;
vals->fa0b0c0d0tx2ty0tz0 += px_2;
vals->fa0b0c0d2tx0ty0tz1 += 2*pt*pz+2*pz_2*z−2*py*y*pz−2*px*x*pz;
vals->fa0b0c0d2tx0ty1tz0 += 2*pt*py−2*py_2*y−2*px*x*py+2*pz*z*py;
vals->fa0b0c0d2tx1ty0tz0 += 2*pt*px−2*px_2*x−2*py*y*px+2*pz*z*px;
vals->fa0b0c0d4tx0ty0tz0 += pz_2*z_2+px_2*x_2+py_2*y_2+pt_2+2*pz*z*pt−
                            2*px*x*pt−2*py*y*pt+2*px*x*py*y−2*px*x*pz*z−
                            2*py*y*pz*z;
vals->fa0b0c1d1tx0ty0tz1 += 4*pz*z*py+4*pz_2*y;
...
   Note that the way that this works is that the fa...'s are the coefficients and that the
names of the variables encode the degree of each monomial
F(a,b,c,d,tx,ty,tz) = fa0b0c0d0tx0ty0tz0+ fa0b0c0d0tx0ty0tz1 * tz +
fa0b0c0d0tx0ty0tz2 * tz^2 + fa0b0c0d0tx0ty1tz1 * ty * tz + ...
And that you start with a generic zero error function
fa0b0c0d0tx0ty0tz0 = 0
fa0b0c0d0tx0ty0tz1 = 0
...
```

Following, this a call is made to a function ptRayGenericPoly_addToVals( ) for each set of points, plane (characterized by (x,y,z,px,py,pz,pt)) and it accumulates the monomial coefficients into the sum error function.

Referring to optional step 36 of FIG. 2, the illustrated system 10 can re-calibrate image acquisition devices 24 that have gone out of alignment, e.g., if one of the cameras is nudged following calibration. (In this regard, it will be appreciated that in the illustrated embodiment, it is preferably intended that the cameras 24 remain fixed and/or stationary after calibration in order to preserve mappings determined during the calibration phase). This may be detected during location triangulation carried out in step 34 and, possible, during that carried out in step 32. To this end, if one camera 24 produces images in which the patterns found in runtime images of an object under inspection appear to lie at locations (e.g., when mapped to the 3D rays for that camera) inconsistent and/or in substantial disagreement with images from the other cameras (e.g,. when mapped using their respective 3D rays), pattern locations determined with the images from those other cameras can be used to re-calibrate the one camera using the same calibration methodology described above in connection with step 30.

In this regard, it will be appreciated that the mappings determined in step 30 (as well as in step 36) are decomposable into two separate effects: lens distortion, such as pincushioning and other image aberrations, which will remain constant if the camera 24 is nudged (because it is only a function of the lens and because, for example, the lens can be glued in place with respect to the CCD, CMOS or other image sensor), and the pose of the camera 24 with respect to the workspace. It is the latter—the pose—that will change if the camera is nudged. In step 36, that aspect of the mapping attributable to the pose of the camera in the workspace can be recomputed, e.g., without requiring a calibration plate, because the lens distortion is assumed to remains constant.

Illustrated system 10 preferably includes a "time out" feature that prevents undue delay in instances where an expected pattern is not detected in an image acquired during runtime phase 34. In this regard, the system simply treats a pattern that is not detected within a designated delay interval (e.g., set by the operator or otherwise) as not found and proceeds with position determination on the basis of the other, found patterns. This has the benefit of making the system 10 more robust with respect to missing features and its operation more timely.

Described above are methods and apparatus meeting the objects set forth above, among others. It will be appreciated that the methods and apparatus shown in the drawings and described above are merely examples of embodiments of the invention, and that other embodiments incorporating changes therein fall within the scope of the invention.

In view of the foregoing, what we claim is:

1. A method of three-dimensional (3D) vision for determining at least one of a position and orientation of an object in three dimensions, the method comprising
   A. calibrating multiple cameras that are disposed to acquire images of the object from different respective viewpoints to discern a mapping function that identifies rays in 3D space emanating from each respective camera's lens that correspond to pixel locations in that camera's field of view,
      wherein the calibrating step includes determining, from images acquired substantially simultaneously by the multiple cameras, correlations between positions in 3D space and pixel locations in each respective camera's field of view,
   B. training functionality associated with the multiple cameras to recognize expected patterns in images of the object acquired by different ones of the multiple cameras, and training that functionality in regard to reference points of those expected patterns, such that training as to those expected patterns facilitates insuring that the reference points for those patterns coincide as between images obtained by those cameras, and
   C. triangulating locations in 3D space of one or more of the patterns from pixel-wise positions of those patterns in images of the object and from the mappings discerned during step (A).

2. The method of claim 1, in which step (C) includes triangulating the locations in 3D space from images of the object taken substantially simultaneously by the multiple cameras.

3. The method of claim 1, comprising a step (D) re-calibrating a selected camera that produces images in which the patterns appear to lie at locations inconsistent and/or in substantial disagreement with images from the other cameras.

4. The method of claim 3, wherein step (D) includes using locations in 3D space determined in step (C) from the images from the other cameras to discern a mapping function that identifies rays in 3D space emanating from the lens of the selected camera that correspond to pixel locations in that camera's field of view.

5. The method of claim 1, wherein step (A) includes positioning registration targets at known positions in 3D space and characterizing correlations between those positions and the pixel-wise locations of the respective targets in the cameras' fields of view.

6. The method of claim 5, wherein step (A) includes characterizing the correlations algorithmically.

7. The method of claim 5, wherein step (A) includes positioning one or more of registration targets that are simultaneously imaged by multiple cameras for purposes of discerning the mapping function.

8. The method of claim 7, wherein step (A) includes imaging registration targets that are disposed on one or more calibration plates in order to discern the mapping function.

9. The method of claim 5, wherein step (A) includes discerning a mapping function for one or more cameras that takes into account warping in the field of view of that camera.

10. The method of claim 1, in which step (B) includes training said functionality associated with the cameras to recognize expected patterns that include any of letters, numbers, other symbols, corners, or other discernible features of the object expected to be imaged.

11. The method of claim 1, in which step (B) includes training said functionality associated with the cameras as to the expected locations in 3D space of the patterns on the object expected to be imaged.

12. The method of claim 11, in which step (B) includes training said functionality associated with the cameras as to the expected locations in 3D space of the patterns relative to one another on the object expected to be imaged.

13. The method of claim 11, in which step (B) includes training said functionality associated with the cameras as to the expected locations in 3D space of the patterns based on user input.

14. The method of claim 11, in which step (B) includes training said functionality associated with the cameras as to the expected locations in 3D space of one or more of the patterns by triangulating actual locations of those patterns from (i) pixel-wise positions of those patterns in images of a training object, (ii) mappings discerned during step (A).

15. The method of claim 11, in which step (B) includes triangulating expected locations in 3D space of one or more of the patterns from (i) pixel-wise positions of those patterns in images of a training object, (ii) mappings discerned during step (A), and (iii) expected locations in 3D space of the patterns on the object expected to be imaged.

16. The method of claim 11, in which step (B) includes training said functionality as to an origin of each pattern.

17. The method of claim 16, in which step (B) includes training said functionality to use like models to identify like patterns as between different cameras.

18. The method of claim 16, in which step (B) includes training said functionality (i) to use different models to identify like patterns as between different cameras, and (ii) to identify like reference points for patterns determined with those patterns.

19. The method of claim 1, in which step (B) includes finding an expected pattern in an image from one camera based on prior identification of that pattern in an image from another camera.

20. The method of claim 1, in which step (C) includes triangulating the position of one or more of the patterns using pattern-matching or other two-dimensional vision tools.

21. The method of claim 1, in which step (C) includes triangulating the position of a pattern in 3D space from a nearest point of intersection of 3D rays of multiple cameras on which that pattern appears to lies.

22. The method of claim 1, in which step (C) includes triangulating the position of a pattern in 3D space from one or more of (i) a nearest point of intersection of 3D rays of multiple cameras on which that pattern appears to lies, (ii) one or more 3D rays of one or more cameras on which others of said patterns lie, and (iii) expected locations the patterns.

23. The method of claim 1, in which step (C) includes use like models to identify like patterns in images of the object acquired by different cameras.

24. The method of claim 23, in which step (C) includes (i) using different models to identify like patterns in images of the object acquired by different cameras, and (ii) identifying like reference points for those patterns notwithstanding that they were identified using different models.

25. The method of claim 1, in which step (C) includes triangulating the location in 3D space of the object even where one or more of the patterns are not detected in images of the object.

26. The method of claim 1, in which step (C) includes aborting detection of one or more patterns in an image of the object, if such detection exceeds a delay interval.

27. A machine vision system operating in accord with any of claims 1, 2, 5, 11, 16 or 19.

28. A method of three-dimensional (3D) vision for determining at least one of a position and orientation of an object in three dimensions, the method comprising
   A. calibrating multiple cameras that are disposed to acquire images of the object from different respective viewpoints to discern a mapping function that identifies rays in 3D space emanating from each respective camera's lens that correspond to pixel locations in that camera's field of view,
   B. training functionality associated with the cameras to recognize expected patterns in images to be acquired by different ones of the multiple cameras of the object,
      wherein the training step includes training, based on images acquired substantially simultaneously by the multiple cameras, the functionality associated with the cameras to select like reference points of said expected patterns, such that training the cameras to select those reference points facilitates insuring that the reference points for those patterns coincide as between images obtained by those cameras,
   C. triangulating locations in 3D space of one or more of the patterns from pixel-wise positions of those patterns in images of the object and from the mappings discerned during step (A).

29. A method of three-dimensional (3D) vision for determining at least one of a position and orientation of an object in three dimensions, the method comprising
   A. calibrating multiple cameras that are disposed to acquire images of the object from different respective viewpoints to discern a mapping function that identifies rays in 3D space emanating from each respective camera's lens that correspond to pixel locations in that camera's field of view,
   B. training functionality associated with the multiple cameras to recognize expected patterns in images of the object acquired by different ones of the multiple cameras, and training that functionality in regard to reference points of those expected patterns, such that training as to those expected patterns facilitates insuring that the reference points for those patterns coincide as between images obtained by those cameras, and C. triangulating locations in 3D space of one or more of the patterns from pixel-wise positions of those patterns in images of the object taken substantially simultaneously by the multiple cameras and from the mappings discerned during step (A).

30. The method of claim 1 wherein the training step further comprises training the selection of the reference points using a laser pointer.

* * * * *